(12) United States Patent
Newman et al.

US012282522B2

(10) Patent No.: US 12,282,522 B2
(45) Date of Patent: Apr. 22, 2025

(54) ASSISTANCE USER INTERFACE FOR COMPUTER ACCESSIBILITY

(71) Applicant: MICROSOFT TECHNOLOGY LICENSING, LLC, Redmond, WA (US)

(72) Inventors: Jacques Christopher Newman, North Bend, WA (US); Travis Scott Leithead, Kent, WA (US); Kurt Allen Catti-Schmidt, Lynnwood, WA (US); Daniel James Libby, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 17/734,029

(22) Filed: Apr. 30, 2022

(65) Prior Publication Data
US 2023/0350967 A1  Nov. 2, 2023

(51) Int. Cl.
*G06F 16/957* (2019.01)
*G06F 3/0481* (2022.01)
(Continued)

(52) U.S. Cl.
CPC .......... *G06F 16/957* (2019.01); *G06F 3/0481* (2013.01); *G06F 16/81* (2019.01); *G06F 16/9558* (2019.01)

(58) Field of Classification Search
CPC ...... G06F 3/0481; G06F 16/81; G06F 16/957; G06F 16/9558; G06F 16/954; G06F 16/9577
See application file for complete search history.

(56) References Cited

U.S. PATENT DOCUMENTS 7,392,510 B1 * 6/2008 Treder ................. G06F 16/958
                                                     709/224
8,078,979 B2 * 12/2011 Howard ................ G06Q 40/08
                                                     715/764
(Continued)

FOREIGN PATENT DOCUMENTS

EP          3379442 B1      11/2020

OTHER PUBLICATIONS

"Accessible Shopping at Amazon for People with Visual Impairments", Retrieved from: https://www.afb.org/blindness-and-low-vision/using-technology/online-shopping-and-bankingaccessibility-people-visual-1, Oct. 19, 2020, 4 Pages.
(Continued)

*Primary Examiner* — Patrick F Riegler
(74) *Attorney, Agent, or Firm* — Shook, Hardy & Bacon L.L.P.

(57) ABSTRACT

A user interface facilitates access to a computer resource by users having accessibility needs. In one implementation, the user interface comprises an assistance user interface (UI) provided as a supplemental UI presented in conjunction with the computer resource and which does not inhibit access to the computer resource. The assistance UI may include UI controls, such as hyperlinks or buttons, to facilitate user access to the computer resource. Particular UI controls and their configuration may be determined based on a category of the computer resource such that computer resources of a similar category have similarly configured assistance UIs or similarly named UI controls. Moreover, particular data features of a computer resource may be programmatically detected and utilized to generate the UI controls such that a particular UI control corresponds to a particular data feature.

20 Claims, 17 Drawing Sheets

(51) Int. Cl.
*G06F 16/81* (2019.01)
*G06F 16/955* (2019.01)

(56) References Cited

U.S. PATENT DOCUMENTS

| | | | | |
|---|---|---|---|---|
| 8,972,376 | B1* | 3/2015 | Gailis | G06F 16/951 |
| | | | | 706/14 |
| 8,972,863 | B2* | 3/2015 | Wald | G06F 16/954 |
| | | | | 715/738 |
| 10,176,336 | B2 | 1/2019 | Navda et al. | |
| 10,650,087 | B2 | 5/2020 | Gupta et al. | |
| 11,223,670 | B1* | 1/2022 | Bindal | H04L 63/0807 |
| 11,610,047 | B1* | 3/2023 | Hotti | G06F 40/134 |
| 2005/0172262 | A1* | 8/2005 | Lalwani | G06F 16/986 |
| | | | | 717/109 |
| 2007/0050703 | A1* | 3/2007 | Lebel | G06F 16/958 |
| | | | | 707/E17.116 |
| 2007/0204232 | A1* | 8/2007 | Ray | G06F 16/9577 |
| | | | | 715/764 |
| 2008/0288477 | A1* | 11/2008 | Kim | G06F 16/9577 |
| 2009/0254834 | A1* | 10/2009 | Wald | G06F 16/957 |
| | | | | 715/738 |
| 2010/0121842 | A1* | 5/2010 | Klinkott | G06F 16/9577 |
| | | | | 707/E17.014 |
| 2010/0238180 | A1* | 9/2010 | Kang | G06T 13/00 |
| | | | | 345/473 |
| 2011/0258152 | A1* | 10/2011 | Wang | G06F 16/35 |
| | | | | 706/12 |
| 2014/0180846 | A1* | 6/2014 | Meron | G06F 40/143 |
| | | | | 715/234 |
| 2014/0258063 | A1* | 9/2014 | Chourasia | G06Q 40/00 |
| | | | | 705/35 |
| 2014/0304774 | A1* | 10/2014 | Bejerasco | G06F 21/62 |
| | | | | 726/3 |
| 2015/0106692 | A1* | 4/2015 | Bolchini | G06F 3/0481 |
| | | | | 715/234 |
| 2016/0070731 | A1* | 3/2016 | Chang | G06F 16/285 |
| | | | | 707/741 |
| 2016/0164984 | A1 | 6/2016 | Chuchro et al. | |
| 2017/0032050 | A1* | 2/2017 | Kol | G06F 8/36 |
| 2017/0053343 | A1* | 2/2017 | Osborne | G06Q 30/0643 |
| 2017/0316519 | A1* | 11/2017 | Wang | G06N 20/00 |
| 2017/0364814 | A1* | 12/2017 | Rinehart | G06F 21/577 |
| 2018/0025012 | A1* | 1/2018 | Cao | G06F 16/287 |
| | | | | 707/740 |
| 2018/0137560 | A1 | 5/2018 | Chopra et al. | |
| 2018/0165364 | A1* | 6/2018 | Mehta | G06F 9/54 |
| 2018/0189614 | A1* | 7/2018 | Chen | G06F 16/958 |
| 2018/0211302 | A1* | 7/2018 | Krishnan | G06N 20/00 |
| 2019/0122258 | A1* | 4/2019 | Bramberger | G06N 3/08 |
| 2019/0171767 | A1* | 6/2019 | Bolla | G06F 16/9535 |
| 2019/0303269 | A1* | 10/2019 | Arieli | G06F 11/3672 |
| 2019/0333159 | A1* | 10/2019 | Chourasia | G06Q 40/00 |
| 2019/0334947 | A1* | 10/2019 | Govardhan | G06F 16/951 |
| 2020/0357023 | A1* | 11/2020 | Tabara | G06Q 30/0259 |
| 2020/0387271 | A1* | 12/2020 | Andrew | G06F 16/957 |
| 2021/0081165 | A1 | 3/2021 | Deshmukh et al. | |
| 2021/0125262 | A1 | 4/2021 | Corrieri et al. | |
| 2021/0295359 | A1* | 9/2021 | Luth | G06N 5/04 |
| 2021/0406337 | A1* | 12/2021 | Frikha | G06F 18/214 |
| 2022/0188699 | A1* | 6/2022 | Matlick | G06F 21/6254 |
| 2023/0018387 | A1* | 1/2023 | Kuksta | G06F 16/954 |
| 2023/0020751 | A1* | 1/2023 | O'Neill | G06F 40/109 |
| 2023/0125087 | A1* | 4/2023 | Jia | G06F 16/957 |
| | | | | 715/234 |
| 2023/0169364 | A1* | 6/2023 | Mueller | G06F 16/986 |
| | | | | 706/12 |
| 2023/0224325 | A1* | 7/2023 | Mautone | H04L 63/083 |
| | | | | 726/22 |
| 2023/0306071 | A1* | 9/2023 | Magureanu | G06F 18/241 |
| | | | | 707/736 |

OTHER PUBLICATIONS

Ingber, Janet, "An Accessibility Check of Popular Online Shopping Sites", Retrieved from: https://www.afb.org/aw/11/7/16014, Nov. 2010, 8 Pages.

"International Search Report and Written Opinion Issued in PCT Application No. PCT/US23/016664", Mailed Date: Jul. 13, 2023, 11 Pages.

Stangl, et al., "BrowseWithMe: An Online Clothes Shopping Assistant for People with Visual Impairments", In Proceedings of the 20th International ACM SIGACCESS Conference on Computers and Accessibility, Oct. 22, 2018, pp. 107-118.

* cited by examiner

FIG. 5A.

ASSISTANCE USER INTERFACE FOR COMPUTER ACCESSIBILITY

BACKGROUND

People today commonly use personal computing devices to access websites over the Internet in order to handle various tasks like shopping, planning travel, education, and banking. But many of these people struggle with navigating many of these websites and accessing their contents. This is especially so for elderly people and people who are differently enabled.

Computer technology can be used to assist many of these users, so that they can more effectively navigate the Internet to perform their tasks. For example, screen readers are software programs that allow blind or visually impaired users to read the text that is displayed on the computer screen with a speech synthesizer. However, despite providing some improvement to these users, many screen readers and other existing assistive technology remain nevertheless ineffective at enabling those users to navigate and access all of the resources on many websites. In particular, many websites are not authored with accessibility in mind, and thus present challenges to the assistive technology, such as causing data to be missing or resulting in site contents being difficult to decipher when represented via the assistive technology. Further complicating the problem is that even among websites that are authored with accessibility in mind, there are differences in design and navigation among various sites that complicate their access by these users. For example, differences in the layouts, menu configurations, disparate item names like shopping cart vs. basket or user account vs. user profile, and the presence and locations of advertisements, introduce problems to the operation of existing assistive technology, impede flow of website navigation by a user, and can cause further confusion and frustration for the user when attempting to navigate across different websites.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards improved computer-user interface technologies. In particular, this disclosure provides technology for enabling computer users, who may have accessibility needs, to access or navigate a computer resource, such as a computer application or website. Technology is also disclosed for improving user computing experiences on user computing devices (sometimes referred to herein as mobile devices or user devices). Accordingly, various implementations of an assistance user interface (UI) are provided to facilitate user control for accessing, navigating, or interacting with a computer resource, such as a website. In some implementations, the assistance UI comprises a supplemental application window that is presented in conjunction with a webpage of a website. For instance, the application window may be displayed as pop-up window or a side bar (sometimes referred to herein as a panel) of a computer browser application that displays the webpage, so that the contents of the webpage are not obscured or concealed.

The assistance UI, such as a panel, can include a number of controls to facilitate user navigation or interaction with the webpage. Particular controls of the assistance UI may be determined based on the contents of the webpage or website and/or the type of webpage or website. Additionally, the assistance UI controls can be configured to correspond to or represent control elements of the webpage, such as hyperlinks, text fields, checkboxes, buttons; elements of the webpage; or a particular portion of webpage content. Some implementations of the assistance UI controls are configured to promote uniformity for a particular website category, such as by configuring the UI controls to have a consistent order or arrangement and consistent UI-control names across similar types of websites. Further, some implementations of the assistance UI are configured to operate with other assistive technologies and in so doing improve the operation of these assistance technologies.

According to one embodiment, upon accessing a webpage of a website by a user computer device, data features associated with the webpage (and in some instances the website) are extracted and used to programmatically determine a category of the webpage or website. Based on the classified webpage or website category, a set of data features of the webpage are extracted and used to generate a data structure. The set of extracted features may comprise entities of the webpage or website and other site components. Locations of extracted data features in the Document Object Model (DOM) of the webpage are determined, and may be indexed to correspond to the extracted data features. From the structured data features, an assistance UI, such as a panel, is generated. The assistance UI may be generated to include a number of controls that are each determined based at least in part on the webpage or website category or extracted data features, and that each correspond to particular entities or site components of the webpage or website.

In this way, embodiments of the assistance UI do not conceal, override, or otherwise limit access to content of an existing website, but instead provide a supplemental control and consistent structure of the website content, thereby improving access and control to users with accessibility needs, as well as improving the performance of other assistive technology. Further, unlike many conventional assistive technologies, embodiments of the assistance UI disclosed herein are website agnostic, with regards to the language(s) used to author a website, and do not require a website to be designed for accessibility, nor is the website author required to modify the website to be compatible with the assistive UI.

BRIEF DESCRIPTION OF THE DRAWINGS

Aspects of the disclosure are described in detail below with reference to the attached drawing figures, wherein:

FIGS. 5A-5I illustratively depict exemplary schematic screenshots from a personal computing device showing aspects of example graphical user interfaces, in accordance with an embodiment of the present disclosure;

DETAILED DESCRIPTION

Figure 1:
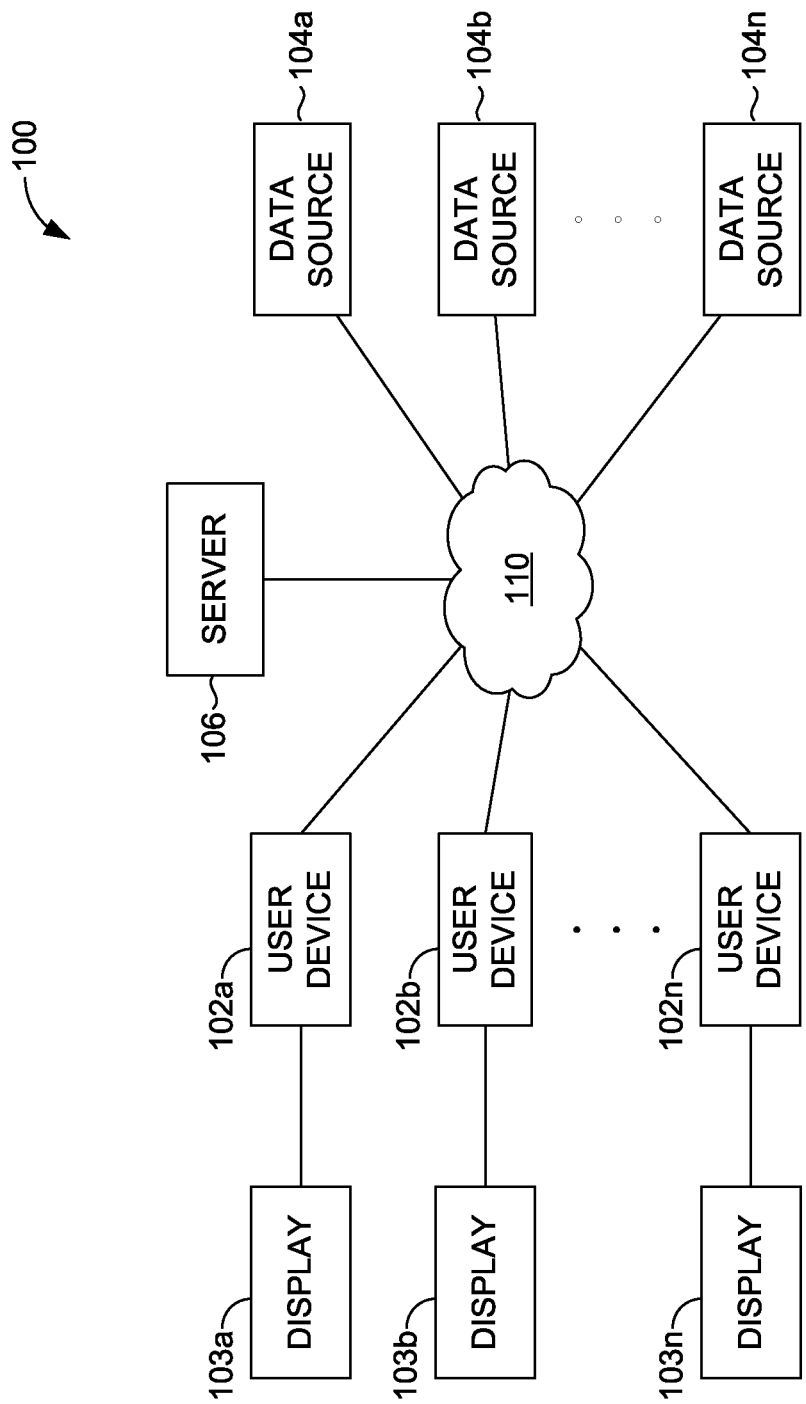
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, it is contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improved computer-user interfaces. In particular, this disclosure provides technology for enabling computer users, who may have accessibility needs, to access or navigate a computer resource, such as a computer application or website. Technology is also disclosed for improving user computing experiences on user computing devices. Accordingly, various implementations of an assistance user interface (UI) are described to facilitate user control for accessing, navigating, or interacting with a computer resource, such as a website.

At a high level and according to an embodiment, an assistance UI comprises a supplemental application window that is presented in conjunction with a webpage of a website. The application window can be displayed as pop-up window or a side bar panel of a computer browser application that displays the webpage, so that the contents of the webpage are not obscured or hidden. One example of an assistance UI, embodied as a panel, is shown as panel 410 in FIG. 4.

The assistance UI, such as a panel, can include a number of controls, such as hyperlinks or a search query field, to facilitate user navigation or interaction with the webpage. Particular controls of the assistance UI are determined based on the contents of the webpage or website and/or the category of webpage or website, such as banking, shopping, education, or other website category. Additionally, the assistance UI controls can be configured to correspond to or represent control elements of the webpage, such as hyperlinks, text fields, checkboxes, buttons; elements of the webpage; or a particular portion of webpage content. For instance, where a user is accessing a shopping website, which allows for browsing and purchasing of products, an assistance UI panel may be generated and provided to the user that includes a panel control for navigating to the website's online shopping cart. Similarly, the panel may include a control for accessing product reviews of a product the user is viewing on the website. Further, some implementations of the assistance UI controls are configured to promote uniformity for a particular website category, such as by configuring the UI controls to have a consistent order or arrangement and consistent UI-control names across similar types of websites. For instance, where the category of a particular website accessed by the user is a shopping website, then in one embodiment, the panel may include a control named "shopping cart" even where the particular website uses a different term, such as "shopping basket," "bag" or another term.

Continuing the example embodiment and at a high level, upon accessing a webpage of a website by a user computer device, data features associated with the webpage (and in some instances the website) are extracted and used to programmatically determine a category of the webpage or website. For example, the type of website may be classified as a shopping website, and the type of webpage may be determined as a product listing page showing various products available to be purchased. In some embodiments, a machine-learning model is employed to determine a likely category of webpage or website, and further, in some embodiments, one or more extraction models are employed to extract data features used for the classification. Based on the classified webpage or website category, a set of data features of the webpage are extracted and used to generate a data structure. For example, in some embodiments, data features may be extracted and assembled into JSON structure or similar hierarchical data structure. In some embodiments, one or more extraction models are employed to recognize and extract particular data features based on the webpage or website classification, as further described herein.

The set of extracted features may comprise entities of the webpage or website and other site components. The term "entity," as in an entity of a webpage or website, is used broadly herein to refer to specific content elements of the webpage or website, which may be pre-determined, that are typically present on a webpage of a particular webpage or website category and employed for user interaction with the contents of the website. For instance, in the example of a shopping website, the entities may comprise, without limitation, the name of a product that is available for purchase, the price, product description, product reviews, and image(s) of the product or a product-image carousel. In some embodiments, the entities can have dependencies or child entities; for example, a product entity can have child entities for product description, price, and reviews. Site components may comprise elements of the webpage or website that are not entities, but which may be identified and extracted for providing additional control or context in an assistance UI. For example, site components may include a search box or search tools such as filters, a website help link, or a website navigation indicator indicating a user's location within a website (often comprising a hierarchical series of hyperlinks typically presented near the top or side of a webpage and indicating the location of the webpage within the website).

In some embodiments of the extraction operation, locations of extracted data features in the Document Object Model (DOM) of the webpage are determined, and may be indexed to correspond to the extracted data features. For example, in some embodiments, a unique ID, corresponding to an extracted data feature, is inserted into the webpage DOM and can be used as an index for the extracted data feature. Alternatively, in some embodiments, at the time the DOM is constructed, each element of the DOM is given an identifier, such as a unique ID, and the DOM IDs for extracted data features (sometimes referred to herein as feature IDs) are used to determine the locations of extracted data features in the DOM. This modified DOM or DOM with feature IDs then may be used for accessing specific elements of the webpage in response to user interactions with the assistance UI, as further described herein.

From the structured data features, an assistance UI, such as a panel, is generated. For example, see the assistance UI panel 410 described in connection with FIG. 4. The assistance UI may be generated to include a number of controls that are each determined based at least in part on the webpage or website category or extracted data features, and that each correspond to particular entities or site components of the webpage or website. For example, as described previously in the case of a shopping website, the assistance UI may include a control for the website's online shopping cart that corresponds to a link (or other control element) on the webpage for the shopping cart.

A user interacting with controls of the assistance UI may be directed to corresponding control elements or content within the webpage. In some implementations, this direction is based on the extracted features used at least in part to determine each particular UI control. More specifically, in response to actuating a particular assistance UI control, a command may be determined and issued to perform an operation at a corresponding aspect of the webpage or website, to navigate to a specific aspect of the webpage or website corresponding to the actuated control, or to perform an operation associated with an aspect of the webpage or website corresponding to the actuated control. In some implementations, the aspect of the webpage or website corresponding to an actuated control is determined from the DOM indexed to the extracted data features that were used, at least in part, to determine the control. For instance, continuing the previous example, where a panel includes a control for "shopping cart," upon a user selecting this control in an assistance UI panel, the user may be directed to a corresponding control element on the webpage, such as a link presented on the webpage, for accessing the shopping cart (or shopping basket, bag, or equivalent name).

Further, in some embodiments, in response to the "shopping cart" UI control being actuated in the assistance UI panel, a command is issued to set the focus of the website to the website's shopping cart link. The focus of a webpage refers to the particular control element or other element on a webpage that currently receives input, such as provided from the keyboard, mouse, or clipboard. For instance, upon a user selecting a UI panel control for "search," the cursor may be positioned within a search bar on the website, thereby enabling the user to enter a search query. In a more detailed example, as described previously in the case of a shopping website, the assistance UI may include a UI control for the website's online shopping cart that corresponds to a link (or other control element) on the webpage for the shopping cart. Thus, upon a user actuating a UI panel control for the shopping cart, the modified DOM or DOM with feature IDs may be used for determining the specific element(s) of the webpage or their location, so that the webpage link (or other control element) on the webpage for the shopping cart is determined as the focus.

In some embodiments where the webpage focus is determined in response to a user interaction with a UI control, the webpage element(s) in focus may be highlighted, or an indication provided so as to assist the user in identifying the portion of the website that corresponds to the actuated UI control. The indication may comprise a visual indication such as a color, highlight, cursor location, boundary or similar visual cue; a tactical indictor corresponding to the location of the focus on the webpage; or an audio indication such as a word or description of the element in focus. In some embodiments, in response to selecting a particular UI control, a command may be issued to perform an operation at the corresponding control element on the webpage or website, such as actuating the control element. For example, in response to selecting the "shopping cart" UI control in the assistance UI panel, instead of being directed to the shopping cart link on the webpage or the user having to select the shopping cart link on the webpage, the browser may navigate to the shopping cart webpage. More specifically, an http request to fetch the shopping cart webpage may be sent to the server, just as though the user selected the shopping cart link on the webpage, rather than selecting the shopping cart UI control in the assistance UI panel.

Some embodiments of the assistance UI are configured to operate with other assistive technologies and in so doing improve the operation of these assistance technologies. For instance, one embodiment of the assistance UI is configured to operate in conjunction with a screen reader program. Upon accessing a webpage, a command is issued to the screen reader to read the assistance UI panel before reading the contents of the website, or to set the focus of the screen reader program to the assistance UI panel. In this way, via the combined operation of the assistance UI and screen reader program, a user can more easily and consistently navigate and interact with the webpage.

Thus, suppose a user is browsing a listing of products on a webpage and the webpage contains numerous ads and unrelated content that are positioned on the webpage above to the listing of products that the user desires to browse. Using only the conventional screen reader program, the user would have to listen to all of the content on the webpage occurring before the product listing, including the ads and unrelated content. Eventually the screen reader program would arrive at the listing of products. Now consider the same scenario with an embodiment of the assistance UI operating together with the screen reader. By issuing a command to the screen reader to start by reading the assistance UI panel before the webpage, the user is first provided a structure of the content on the webpage. If the assistance UI panel includes a control for navigating to "product list," then the user can actuate that assistance UI control, wherein subsequently the screen reader is focused on the listing of products on the webpage. The user is thus spared having to wait for the screen reader to read all of the content occurring on the webpage above the listing of products, such as the ads. But the ads and content are not blocked and remain present on the webpage. In particular, the original content visible (or audible) on the webpage is not modified by the assistance UI.

Similarly, in response to actuating a particular assistance UI control, some embodiments of the assistance UI issue an API call to another assistive technology, thereby improving the functionality of the other assistive technology by enabling it to carry out an operation associated with the actuated assistance UI control. For example, an API call may be made to a screen reader program to provide the focus of an aspect of the website corresponding to the actuated assistance UI control. In response to receiving the focus information via the API call, the screen reader will read the aspect of the website corresponding to the actuated assistance UI control.

Overview of Technical Problems, Technical Solutions, and Technological Improvements The coalescence of telecommunications and personal computing technologies in the modern era has enabled, for the first time in human history, information on demand and a ubiquity of personal computing resources (including mobile personal computing devices and cloud-computing coupled with communication networks). As a result, it is increasingly common for users to rely on one or more computing devices throughout the day for handling various tasks. But many of these users struggle using their computing devices, especially elderly users and users who are differently enabled. In particular, conventional computer user interfaces lack functionality for computer controls to be operated by users having accessibility needs.

As described previously, computer technology can be used to assist many of these users, so that they can more effectively interact with their computing devices and control the operation of their devices. However, despite providing some improvement to these users, conventional assistive technologies for computer user interfaces have a number of technical deficiencies. In particular, these deficiencies render the conventional technologies ineffective or incapable at functioning as an interface for those users to be able to control the operations of the computer to access and navigate computer resources in order to handle their various tasks. For example, in many instances, websites and other computer resources must be designed with accessibility in mind in order for the conventional assistive technologies to operate effectively. This is because many conventional assistive technologies are not website agnostic in regards to the programming language and design elements used to author the website. Thus, users are left unable to access certain resources on these websites, or website content is unintelligible or difficult to decipher when accessed via the conventional assistive technology. Even among websites that are authored with accessibility in mind, differences in design and navigation among various sites introduce problems into the user interfaces of these conventional assistive technologies. For example, differences in the layouts, menu configurations, disparate item names like shopping cart versus basket or user account versus user profile, and the presence and locations of advertisements, introduce problems to the operation of existing assistive technology, as well as impede flow of website navigation by a user causing further confusion and frustration for the user. Further still, some existing assistive technologies generate a new user interface that replaces all or portions of the underlying website. For example, these assistive technologies will display a textual overlay blocking the site, or text-only representation of the site. As a consequence, users are deprived of accessing all of the contents of the site, and website owners are left frustrated because the look and feel of their website, and in some instances their brand, is modified and results in a limited experience for the user.

These and other technical deficiencies of the conventional technology are mitigated by the embodiments of the assistance UI provided herein. Additionally, computing technology for programmatically generating a novel computer user interface, as described herein, is beneficial for enabling computer users, who may have accessibility needs, to access or navigate a computer resource, enabling improved computing applications, and for an improved user computing experience. Further, some embodiments of this disclosure enable a computer to perform operations, at the request of a user, that otherwise are inaccessible or inoperable while using conventional assistive technologies, for example, by providing the user greater access to a computer resource such as a website. Further still, some embodiments of this disclosure provide control mechanisms enabling a user to access aspects of computer resources that are inaccessible by conventional assistive technologies.

Further still, some embodiments of this disclosure provide a computer-user interface for accessing a computer resource such as a website that does not conceal or override content of resource. Further still, some embodiments of this disclosure provide a computer-user interface having an operation that is not dependent on the design or language(s) used to author the computer resource, such as a website accessed by the interface. Further still, some embodiments of this disclosure modify the operation of other assistive technologies to improve their operation, and, in so doing, also conserve utilization of resources such as bandwidth and power consumption. For example, these resources are conserved by causing the assistive technologies to perform with greater computational efficiency, such as by reducing their unnecessary utilization and directing their operation to aspects of a website the user is interested in navigating.

Further still, embodiments of this disclosure enable an improved user experience across a number of computer devices, applications, and platforms. In this way, some embodiments of the assistance UI described herein do not hide, override, or otherwise limit access to content of an existing website, but instead provides a supplemental control and consistent structure of the site content, thereby improving access and control to users with accessibility needs, as well as improving the performance of other assistive technology. Further, in this way, some embodiments of the assistance UI described herein are website agnostic, with regards to the language(s) used to author a website, and do not require a website to be designed for accessibility, nor is the website author required to modify the website to be compatible with the assistive UI. Further still, in this way, some embodiments of this disclosure improve the utilization of computing resources by enabling more efficient control of computing operations by a user.

Additional Description of the Embodiments

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as: user devices 102a and 102b through 102n; a number of data sources, such as data sources 104a and 104b through 104n; server 106; displays 103a and 103b through 103n; and network 110. It should be understood that environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. The displays 103a and 103b through 103n each may comprise a screen, monitor, projector, output surface, or similar device operable to display text, images, graphics elements, or other content, and may comprise an embodiment of presentation component 816 described in connection to FIG. 8. Displays 103a and 103b through 103n may be integrated into the user devices 102a and 102b through 102n, or may comprise separate display devices that are communicatively coupled to the user devices 102a and 102b through 102n. In one embodiment, the displays 103a and 103b through 103n are touchscreen displays. It is further contemplated that some embodiments of a user device may not include or be communicatively coupled with a display.

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, any other suitable computer device, or any combination of these delineated devices.

Data sources 104a and 104b through 104n may comprise data sources and/or data systems, which are configured to make data available to any of the various constituents of operating environment 100 or system 200 described in connection to FIG. 2. For instance, in one embodiment, one or more data sources 104a through 104n provide (or make available for accessing), to system architecture 200 of FIG. 2, data from a computer resource, such as a website (or webpage), online content, content accessed via a computing application, or other data that a user may desire to browse, navigate, or interact with. Data sources 104a and 104b through 104n may be discrete from user devices 102a and 102b through 102n and server 106 or may be incorporated and/or integrated into at least one of those components. In one embodiment, one or more of data sources 104a through 104n include one or more sensors, which may be integrated into or associated with one or more of the user device(s) such as 102a, or server 106.

Figure 2:
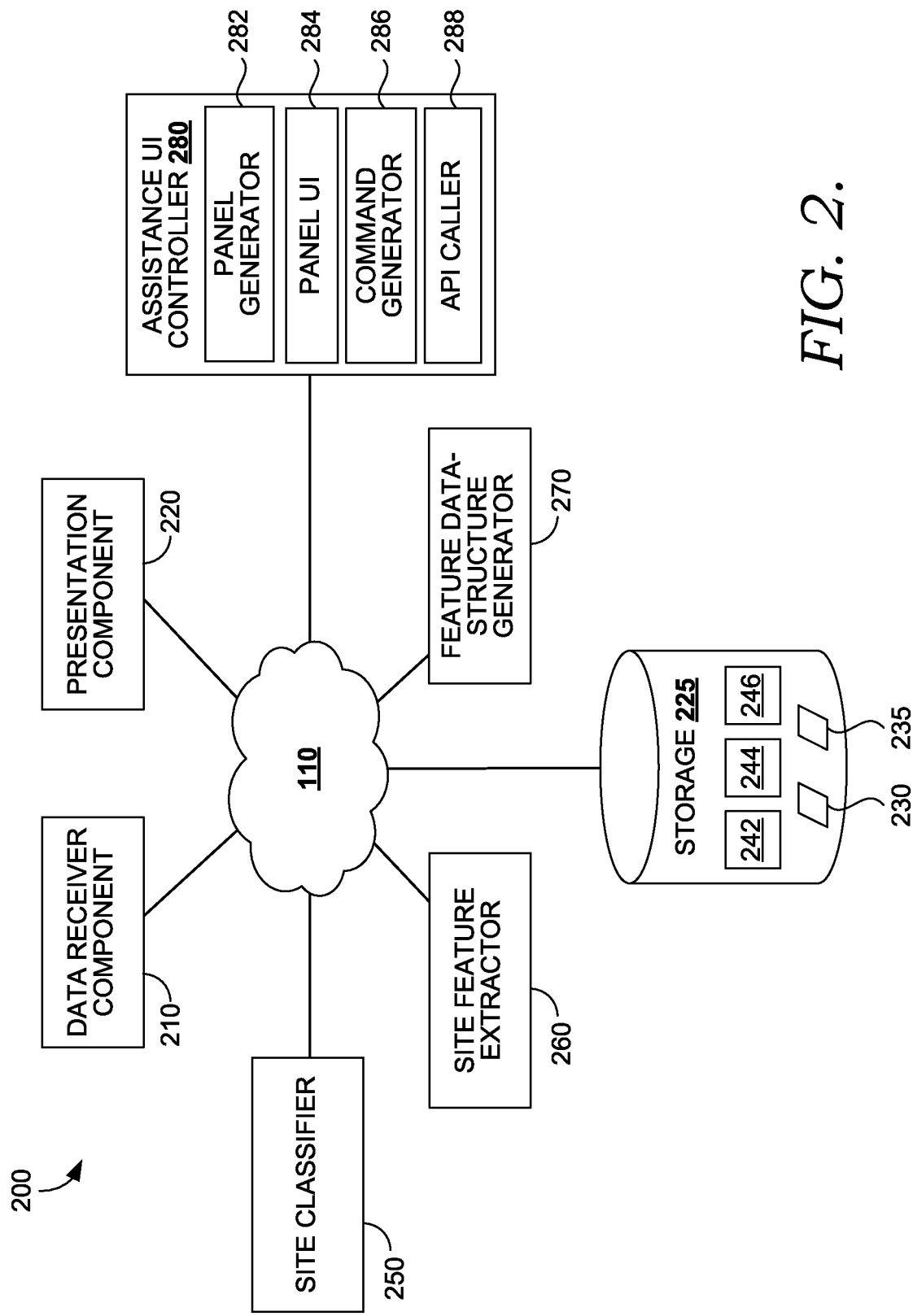
FIG. 2 is a diagram depicting an example computing architecture suitable for implementing aspects of the present disclosure.
Figure 6:
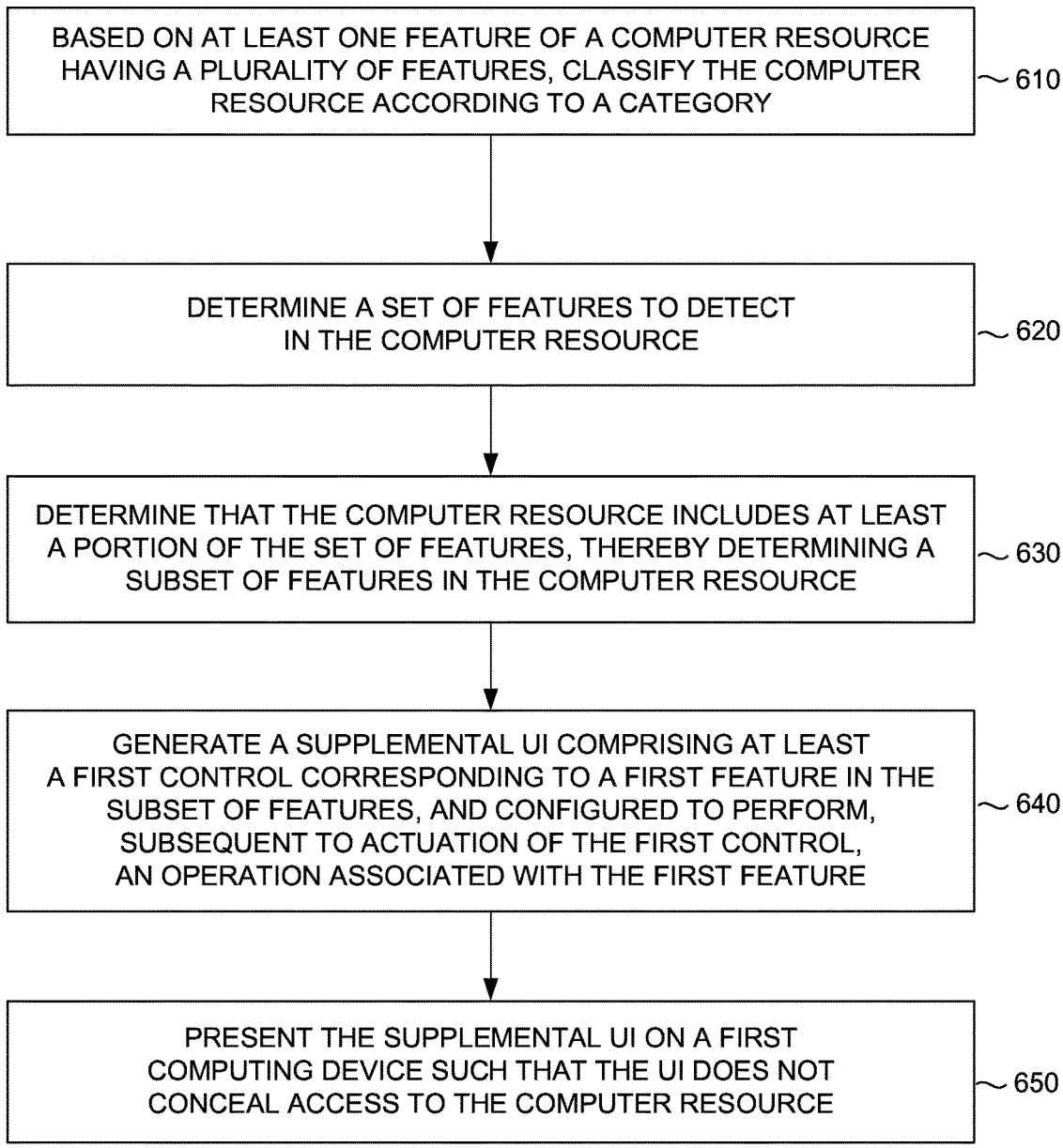
FIGS. 6 and 7 depict flow diagrams of methods for implementing an assistance user interface, in accordance with an embodiment of the present disclosure.
Figure 7:
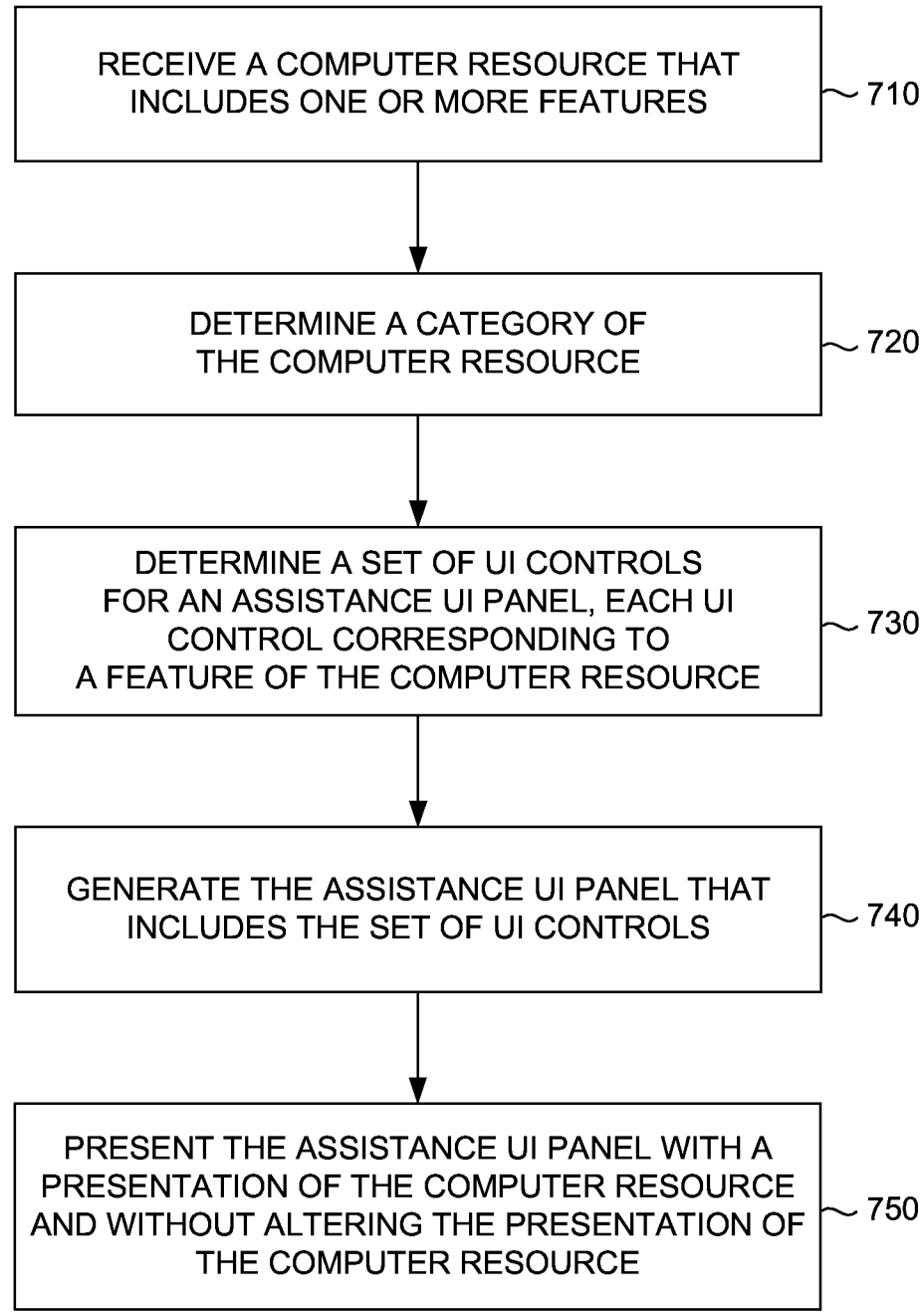

Operating environment 100 can be utilized to implement one or more of the components of system 200, described in FIG. 2, and can also be utilized for implementing aspects of methods 600 and 700 in FIGS. 6 and 7, respectively. Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200, including data receiver component 210, presentation component 220, site classifier 250, site feature extractor 260, feature data-structure generator 270, assistance UI controller 280, and storage 225. Assistance UI controller 280 (including its subcomponents 282, 284, 286, and 288), site classifier 250, site feature extractor 260, feature data-structure generator 270, data receiver component 210, and presentation component 220, may be embodied as a set of compiled computer instructions or functions, program modules, computer software services, or an arrangement of processes carried out on one or more computer systems, such as computing device 800, described in connection to FIG. 8, for example.

In one embodiment, the functions performed by components of system 200 are associated with one or more computer applications, services, or routines, such as a web browser computer application; a browser extension, plug-in or add-on; a viewer application; a mobile device app; or a user-assistance software program. The functions may operate to determine or provide an assistance user interface and/or otherwise to provide an enhanced computing experience for a user. In particular, such applications, services, or routines may operate on one or more user devices (such as user device 102a) or servers (such as server 106). Moreover, in some embodiments, these components of system 200 may be distributed across a network, including one or more servers (such as server 106) and/or client devices (such as user device 102*a*), in the cloud, such as described in connection with FIG. 9, or may reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. Additionally, although functionality is described herein with regard to specific components shown in example system 200, it is contemplated that in some embodiments, functionality of these components can be shared or distributed across other components.

Continuing with FIG. 2, data receiver component 210 is generally configured to access or receive (and in some cases also identify) data, which may include data associated with a computer resource, from one or more data sources, such as data sources 104*a* and 104*b* through 104*n* of FIG. 1. In some embodiments, data receiver component 210 may be employed to facilitate the access of data of a particular computer resource or plurality of resources for site classifier 250, site feature extractor 260, assistance UI controller 280, or other component (or subcomponent) of system 200. The data may be received (or accessed), and optionally accumulated, reformatted, and/or combined, by data receiver component 210 and stored in one or more data stores such as storage 225, where it may be available to other components of system 200. In some embodiments, any personally identifying data (i.e., user data that specifically identifies particular users) is either not uploaded or otherwise provided from the one or more data sources, is not permanently stored, is de-identified, and/or is not made available to other components of system 200. In addition or alternatively, in some embodiments, a user may opt into or out of services provided by the technologies described herein and/or select which data and/or which sources of data are to be utilized by these technologies described herein.

In some embodiments, data received via data receiver component 210, which may comprise aspects of a computer resource, is obtained from a data source (such as data source 104*a* in FIG. 1. Examples of data sources (such as data source 104*a* in FIG. 1) or computer resources from which data may be received may comprise, without limitation, a website or webpage, which may be a local intranet site or on the Internet; an online, distributed, or local data source such as a file share, repository, library or other source of data; data or a computer resource typically accessible via a dedicated program or application, such as a dedicated app for accessing a particular resource such as a social media platform, a communications service or application such as messaging or email, a shopping platform or site, a banking or financial platform or site, an educational platform or site, a government or social services platform or site, travel-planning platform or site, or a real-estate platform or site; data or a computer resource accessible via a browsing, viewing, or streaming application such as a media player or electronic game; or nearly any other source of data that may be sensed, detected, or determined as described herein. Further, some embodiments of data receiver component 210 utilize feature extraction logic 235, as described herein, to identify and extract various data or metadata from a computer resource.

In some embodiments, data received via data receiver component 210 includes structured, semi-structured or unstructured data. For example, the data may comprise HTML, script, or computer code from a website. In some instances, the data includes metadata, such as information about the source of the data, such as a website domain name, URL, or IP address, for example. Similarly, local data, which may include metadata, may be received or determined via data receiver component 210 such as information regarding the operating system and/or computer system of the user such as display information, application(s) such as a computer browser, or available computer system resources. Further, in some embodiments, a computer browser or computer application used for accessing a particular data source may be employed by data receiver component 210 for accessing or receiving data. For example, a web browser may be employed to provide data (including metadata) about a website or webpage as well as data (including metadata) about the browser version, and computing device of the user such as information about the operating system, display or display drivers, or computing applications installed on the computing device such as a screen reader or other assistance program.

In some embodiments, data receiver component 210 (or other components or subcomponents of system 200 such as site classifier 250, site feature extractor 260, feature data-structure generator 270, or assistance UI controller 280) can determine interpretive data from the received data. Interpretive data corresponds to data utilized by the components or subcomponents of system 200 that comprises an interpretation from processing raw data, such as generalized topic or category information interpreted from raw, specific data on a website or similar semantic information interpreted from raw data. Interpretive data also can be used to provide context to other data, which can support determinations or inferences carried out by components of system 200. Moreover, it is contemplated that some embodiments of the disclosure utilize raw data alone or in combination with interpretive data for carrying out the objectives of the subcomponents described herein.

It is also contemplated that some data may be processed, by other subcomponents of data receiver component 210 not shown, such as for interpretability by data receiver component 210. For example, in some embodiments, HTML or other webpage data received by data receiver component 210 may be processed for formatting into a document object model (DOM). However, embodiments described herein do not limit the data to processed data and may include raw data or a combination thereof, as described above.

Site classifier 250 is generally responsible for classifying a category or domain of a computer resource such as a website or webpage. Embodiments of site classifier 250 classify a computer resource according to a category or domain, and may further determine contextual information related to the category or domain computer resource. For example and without limitation, a computer resource that is a website may be classified as a banking website, shopping website, education website, government website, utility payment website (e.g., a website for paying water, gas, electric, or similar utilities) or consumer services payment website (e.g., a website for paying a consumer service such as cable television or mobile phone), social media website, blog or news-media website, entertainment or streaming media-content website, or travel-planning website.

Some embodiments of site classifier 250 further determine a sub-category or sub-domain of the computer resource. For example, a computer resource that is a webpage may be classified as a product listing page (i.e., the determined sub-category) of a shopping webpage or website (i.e., the determined category). By way of example and without limitation, sub-categories can include: for a shopping category: product list page, product details page, shopping cart page, reviews page, shipping and returns page, or payment page; for a banking category: various accounts pages (e.g., checking, savings, vacation), loan page, authentication page, and transactions page; for an education category: course page, enrollment page, student resources page, tuition-related page; for a utility or services payment category: current or past bill page, payment page, account profile page, and a listing of services page; and for a travel-planning category: search travel itineraries page, search results page, traveler profile and preferences page, upcoming travel itinerary page, past travel itineraries page, and payment page. Similar sub-categories exist and are determined for various types of websites according to specific types of webpages commonly present on a particular type of website. Some embodiments of site classifier 250 determine contextual information related to the category or domain. For example, information about a website that is classified as a shopping website may include that the shopping website is for clothes, groceries or commodities, or digital music. (As further described herein, some embodiments of the assistance UI, described in connection with assistance UI controller 280, utilize aspects of this contextual information when determining UI panel controls.) In some embodiments, a set of possible categories or domains (including sub-categories or sub-domains) for which a particular computer resource may be classified is predetermined, such as described in connection with site classification logic 230, and in some instances may be specified by a user or administrator.

Embodiments of classifier 250 can receive data of a computer resource to be classified from data receiver component 210 or from storage 225. For example, website or webpage data may be received from a browser application via data receiver component 210. In some embodiments, the data received by classifier 250 comprises a DOM for a particular webpage, and may further comprise metadata about the webpage such as the domain name or URL. Computer resource classifications and contextual information determined by site classifier 250 may be made available to other components of system 200 and/or stored in storage 225, such as in computer resource classifications 242, where they may be accessible to other components of system 200.

Embodiments of classifier 250 utilize data features of the computer resource to perform a classification. For instance, data features, which are further described in connection with site feature extractor 260, may include information about the computer resource source, such as the domain name or URL of a website, and data characteristics of the computer resource, such as text, images, and other content. For example, a computer resource that is an education website may be classified according to data features including the website domain, such as a domain name including a particular word like "school" or "university"; the domain suffix type (e.g., .edu); or based on a determination that the website is included on a predetermined list of known education sites. Additionally or alternatively, data features of the website (or webpage) may be utilized for the classification, for instance the presence of text detected on the website, such as "courses" "grades" "enrollment", can be extracted and used to classify the website as likely being an education site.

Some embodiments of classifier 250 utilize feature extraction logic 235, as described herein, to identify and extract various data or metadata from a computer resource for classification. In particular, in some instances, computer resource data received from data receiver component 210 may be utilized for an initial classification by classifier 250, such as determining a category or probable category. Subsequently to this determination, additional data features may be identified or extracted in order to further confirm the initial classification or to determine a sub-category. For example, a word occurring in the domain name, such as "bank" may be used to perform an initial classification by classifier 250 that a computer resource website is likely a banking website. Subsequently, the computer resource data may be further processed to identify or extract specific data features that are typically present on banking websites, such as the presence of certain words like "account balance" "checking" "loans" or other data features present in the website data.

Some embodiments of classifier 250 utilize site classification logic 230 to classify a computer resource. Site classification logic 230 can comprise computer instructions including rules, conditions, associations, classification models, or other criteria for performing a classification of a computer resource, such as a website. The classification may be based on data associated with the computer resource, which may be received by classifier 250 from data receiver component 210. In some embodiments, site classification logic 230 includes logic, such as computer-executable instructions, for detecting from the computer resource data an indication of a computer resource category (or sub-category) or one or more data features that may indicate a particular category (or sub-category). These embodiments of site classification logic 230 may further include logic for inferring a category or sub-category, based on the indication of one or more data features. Site classification logic 230 may take different forms depending on the particular computer resource, and may comprise combinations of the logic described herein.

Some embodiments of site classification logic 230 include logic for programmatically determining a category (or sub-category) of a computer resource by processing an initial portion of data associated with the computer resource, which may be received from data receiver component 210, and then subsequently processing additional data associated with the resource. For instance, in the above example of classifier 250 where an initial classification is performed, such as by determining a category or likely category, and then subsequently processing additional data in order to confirm the initial classification or to determine a sub-category.

In some embodiments, the logic for programmatically determining a category (or sub-category) includes logic for querying or processing the data of a computer resource to detect particular data features indicative of a particular category. Alternatively or in addition, embodiments of site classification logic 230 include a set of rules for comparing particular data features of a computer resource to predetermined data features that are indicative of a particular category. For example, in one embodiment, a data table is maintained and utilized to classify particular websites. The data table comprises the domain names for popular websites and corresponding website categories (e.g., shopping, banking, education, or the like). In some of these embodiments of site classification logic 230, a webpage URL or domain name of the computer resource is checked against the table, and where a match is determined, the corresponding category in the table is determined as the classified category for the computer resource.

Accordingly, in the embodiments of classifier 250 using site classification logic 230, the site classification logic 230 may take different forms. For example, the site classification logic 230 may comprise a set of rules (which may include static or predefined rules or may be set based on settings or preferences configured by a user or administrator), Boolean logic, decision trees (e.g., random forest, gradient boosted trees, or similar decision algorithms), conditions or other logic, classification model, a deterministic or probabilistic classifier, fuzzy logic, neural network, finite state machine, support vector machine, logistic regression, clustering, machine learning algorithms, similar statistical classification processes, or combinations of these. For example, some embodiments of site classification logic 230 comprise one or more classification models for determining a category or subcategory of a computer resource. In particular, one embodiment of site classification logic 230 includes a set of one or more models that are trained, using supervised learning, on various websites of different categories and sub-categories. In one embodiment, Microsoft's Platform for Interactive Concept Learning (PICL) is utilized to develop and deploy the one or more classification models of site classification logic 230. Alternatively, other platforms such as Cloud AutoML, TensorFlow, or Teachable Machine by Google, SageMaker by Amazon, or similar platforms may be used to develop a classification model for site classification logic 230.

Continuing with FIG. 2, site feature extractor 260 is generally responsible for detecting data features of a computer resource such as a website or webpage. Embodiments of site feature extractor 260 process data associated with the computer resource, based on the classification of the resource as determined by site classifier 250, to detect one or more specific types of data features. In particular, site feature extractor 260 receives data associated with a computer resource, such as a webpage, and further receives classification information of the computer resource, which may be received from classifier 250 or from computer resource classifications 242 in storage 225. Based on the classification information, which may include a category and/or sub-category classification of the computer resource, site feature extractor 260 processes and extracts specific data features from computer resource data, according to the classification.

Some embodiments of site feature extractor 260 comprise one or more applications or services that parse and analyze data of a computer resource to identify, extract, or otherwise determine the data features. The data features can comprise entities and/or other site components, as described previously, and may be specific to a particular category of computer resource. For example, data feature entities for a webpage classified as a product details page (a sub-category classification of a shopping website category) may include a product description, price, review(s), and images.

In some embodiments, site feature extractor 260 indexes the location of detected or extracted data features in the data of the computer resource. For example, where the computer resource comprises a webpage, the embodiments of site feature extractor 260 index the locations of elements in the DOM corresponding to the extracted data features. In some embodiments, an identifier, such as a unique ID for a particular data feature (sometimes referred to herein as a feature ID), is inserted into the DOM at a location from where the data feature is extracted. In so doing, these embodiments of site feature extractor 260 generate a modified DOM, which then can be utilized for accessing specific elements or portions of the computer resource in response to user interactions with an assistance UI. Alternatively, in some embodiments such as those where an assistance UI is implemented as a feature of the browser, at the time the DOM is constructed, each element of the DOM is given an identifier, such as a unique ID, and the DOM IDs for extracted data features (i.e., feature IDs) are used for determining the locations in the DOM of extracted data features. Some embodiments of site feature extractor 260 determine a feature location index, based on the DOM, which may comprise the feature IDs in the DOM of extracted features. In this way, as further described in connection with assistance UI controller 280, an indexed location of an extracted data feature may be used for accessing a portion of the computer resource having the data feature by actuating an assistance UI control associated with the data feature. Embodiments of site feature extractor 260 that generate a modified DOM, a DOM with feature IDs (i.e., DOM IDs that may be used to identify the locations of extracted features), or a feature location index of feature IDs for extracted features, may store this DOM-related data in data structures 244 of storage 225, where it is accessible to other components of system 200, such as assistance UI controller 280.

Some embodiments of site feature extractor 260 utilize feature extraction logic 235 to determine, detect, and/or extract data features from of a computer resource such as a website or webpage, and, in some embodiments, to further index locations of certain data features in the computer resource. Feature extraction logic 235 can comprise computer instructions including rules, conditions, associations, entity extraction models, classification models, inference algorithms, or other logic for extracting data features from the data of a computer resource. Feature extraction logic 235 may take different forms depending on the particular data features that are detected and/or extracted and may comprise combinations of logic described herein.

In some embodiments, feature extraction logic 235 includes logic, such as computer-executable instructions, for programmatically detecting specific types of data features according to a category (or sub-category) of the computer resource. For example, in some embodiments, for a particular classified category or sub-category, feature extraction logic 235 includes a corresponding data structure schema that specifies specific data features, or types of data features, to look for in the computer resource. For example, where the computer resource is classified as a product details webpage, a corresponding data structure schema may include specific data features for entities (and in some instances child entities) typically present on a product details webpage, such as data features corresponding to price, product description, reviews, or the like. In some embodiments, based on a particular classified category or sub-category, a set of rules, decision tree, or similar logic is utilized to programmatically process data associated with the computer resource to detect specific data features or types of data features. Alternatively or in addition, feature extraction logic 235 may comprise logic for inferring specific data features or data feature types according to a category (or sub-category) of the computer resource. For example, an inference or prediction model may be employed to detect specific data features or types of data features. In some embodiments, the logic for programmatically detecting specific types of data features includes logic for querying or processing the data of a computer resource to detect particular data features corresponding to a particular category. In some embodiments, a combination of rules or decision tree(s) and entity extraction models are utilized by feature extraction logic 235.

Some embodiments of feature extraction logic 235 may comprise a set of rules (which may include static or pre-defined rules or may be set based on settings or preferences configured by a user or administrator), Boolean logic, decision trees (e.g., random forest, gradient boosted trees, or similar decision algorithms), conditions or other logic, entity extraction model(s), classification model(s), deterministic or probabilistic classifier(s), fuzzy logic, neural network(s), finite state machine(s), support vector machine(s), logistic regression(s), clustering, machine learning algorithms, similar statistical classification processes, or combinations of these. For example, some embodiments of feature extraction logic 235 comprise one or more entity extraction models for determining a category or subcategory of a computer resource. In particular, in one embodiment, the entity extraction models include logic to tokenize the data associated with a computer resource, such as a DOM and related metadata of the webpage (e.g., page title, URL, or other data related to the webpage or website). For example, from the DOM text, a sequence of tokens may be determined. In some implementations, the Viterbi algorithm is utilized to identify the most likely sequence of hidden states (here: predictions of inferences of specific data features such as specific entities) given the sequence of observed states (here: tokens) along a particular sequence of tokens. In some embodiments, feature IDs of the DOM are included in (or appended to) the tokens to facilitate tracking, so that for particular features (or a set of features) that are classified, such as a specific entity of the computer resource, the corresponding identifier in the DOM (i.e., the feature ID) is known and may be used subsequently to facilitate generating an assistance UI. Further, in some embodiments, a confidence threshold (e.g., above a 0.6 probability) is employed so that inferred data features (e.g., specific entities) must satisfy the confidence threshold to be considered detected.

In some embodiments, the one or more entity extraction models are trained, using supervised learning, on various websites of different entities corresponding to a particular category or sub-category of a computer resource. In one embodiment, Microsoft's Platform for Interactive Concept Learning (PICL) is utilized to develop and deploy the one or more entity extraction models of feature extraction logic 235.

Continuing with FIG. 2, feature data-structure generator 270 is generally responsible for generating or determining a data structure of the data features detected or extracted from a computer resource by site feature extractor 260. For example, the data features determined by site feature extractor 260 may be formatted or assembled into a hierarchical data structure such as a JSON structure. In some instances, extracted entities and child entities make up various levels of the hierarchy of the data structure. Data structures determined by feature data-structure generator 270 may be stored in storage 225, such as in data structures 244.

Some embodiments of feature data-structure generator 270 operate with site feature extractor 260, so that detected data features are copied into a data structure generated by feature data-structure generator 270. Further, some embodiments of feature data-structure generator 270 utilize aspects of feature extraction logic 235 to generate a data structure. For example, for embodiments of feature extraction logic 235 that include data structure schemas, these data structure schemas may be utilized by feature data-structure generator 270 to generate the data structure. As the data structure schemas correspond to a particular category or sub-category of a computer resource, a data structure generated according to a data structure schema will thus correspond to a particular category or sub-category of a computer resource. Accordingly, in embodiments utilizing the data structure schemas, feature data-structure generator 270 generates a data structure of data features according to the category (or sub-category) of computer resource. Thus, for example, while the data populated in a data structure will be different for different websites, a data structure generated based on a first category or website, such as a shopping website, may have a different structure than a data structure generated for a second type of website, such as a banking website.

As another example of feature data-structure generator 270 utilizing data structure schemas of feature extraction logic 235, where a particular computer resource has been classified as a product listing page of a shopping website, a data structure schema corresponding to a product listing webpage may be utilized to generate a JSON data structure comprising the at least a portion of the data features extracted from the product listing webpage by site feature extractor 260. The JSON data structure, as specified in the data structure schema, may include data fields for entities, such as products and subfields for child entities, such as product price or product description. For instance, the specific key-value pair for a product entity can be defined as product: the specific product-name (e.g., "product: Microlight Alpine Jacket—Men's", such as shown in connection with item 425 of FIG. 4). Alternatively, a defined JSON object for a product entity may compose the structure: product: product name: (extracted data feature value that is the name of the product), product description: (extracted data feature value that is the description of the product), product price: (extracted data feature value that is the description of the product), and so on, with additional subfields included that are part of this example defined JSON object for a product entity.

Assistance UI controller 280 is generally responsible for generating and/or controlling operation of an assistance computer user interface (UI). As described previously, an assistance UI may be provided to facilitate user control for accessing, navigating, or interacting with a computer resource, such as a website. Embodiments of assistance UI controller 280 receive data features of the computer resource (which may be determined by site feature extractor 260 and assembled into a data structure by feature data-structure generator 270) and generate the assistance UI. In some embodiments, the assistance UI comprises a supplemental application window that is presented in conjunction with the computer resource, such as a website or webpage of a website. In an embodiment, the application window can be displayed as pop-up window or a side bar panel of a computer browser application or viewer application that displays the computer resource (e.g., the webpage), so that the contents of the computer resource (e.g., webpage) are not obscured or hidden by the assistance UI. Some embodiments of assistance UI 280 may be implemented as part of an extension, plug-in or add-on to a browser, viewer application, or other computer program utilized for accessing and/or providing a computer resource such as a webpage. Alternatively, some embodiments of assistance UI controller 280 may be implemented as a standalone computer program such as a web browser application, a viewer application, assistance application or other computer application, which may run locally (such as on a user device 102a of FIG. 1), on a server (such as server 106 of FIG. 1), or in a distributed environment (such as described in connection to FIG. 9). One example of an assistance UI, embodied as a panel, is shown as assistance UI panel 410 in FIG. 4, which is presented adjacent to webpage 420 (a computer resource), and is described further in connection to FIG. 4. In some embodiments, assistance UI controller 280 generates an assistance UI based on a UI template or UI logic, as described further herein, which may be specific to the category or sub-category of the computer resource for which the assistance UI is employed to access. The assistance UI can be generated to include a number of UI controls, which may be specified according to the UI template or UI logic, and used to facilitate user navigation or interaction with aspects of the computer resource (e.g., a webpage).

As shown in example system 200, assistance UI controller 280 comprises a panel generator 282, panel UI 284, command generator 286, and API caller 288. Additionally, although several examples are described herein of how assistance UI controller 280 and its subcomponents can generate and control the operation of an assistance UI, many variations of an assistance UI, including the format (e.g., a panel) and operation, are possible according to the various embodiments of the disclosure. Panel generator 282, in general, is responsible for generating an assistance UI, which may comprise a panel or sidebar, as described herein, such as the example panel 410 shown in FIG. 4. Embodiments of panel generator 282 construct or generate a panel based on data features of the computer resource. A panel can be generated to include a number of controls to facilitate user navigation or interaction with the computer resource (e.g., a webpage). By way of example and without limitation, a control may comprise a hyperlink or hypertext link, a button, slider, text field, or a search query input field.

Particular controls may be determined based at least in part on the data features (e.g., entities and site components) extracted from the computer resource. Thus, embodiments of panel generator 282 may receive a set of one or more extracted data features from site feature extractor 260 or a data structure of one or more extracted features from feature data-structure generator 270. For example, in the case of a shopping webpage listing details of a product, the panel may include a control for the product description that corresponds to an extracted entity of the webpage that is the product description on the webpage. Further, in some embodiments, each panel control (or at least a portion of the panel controls) corresponds to or represents: a control element that is present in the computer resource, an aspect or element of the computer resource content, or a particular portion of the computer resource content. Thus, according to these embodiments, actuating a particular panel control causes an interaction with the corresponding control element of the computer resource or the element or portion of the computer resource content. (For example, as described previously, actuating the panel control navigates to [or sets a focus on] the corresponding control element, other element, or portion of the computer resource.) One example of a panel control and a corresponding control element in the content of computer resource is illustratively provided in FIG. 4 as panel control 412 for a shopping cart, which corresponds with the element 422 for the "cart" control element on webpage 420.

Figure 4:
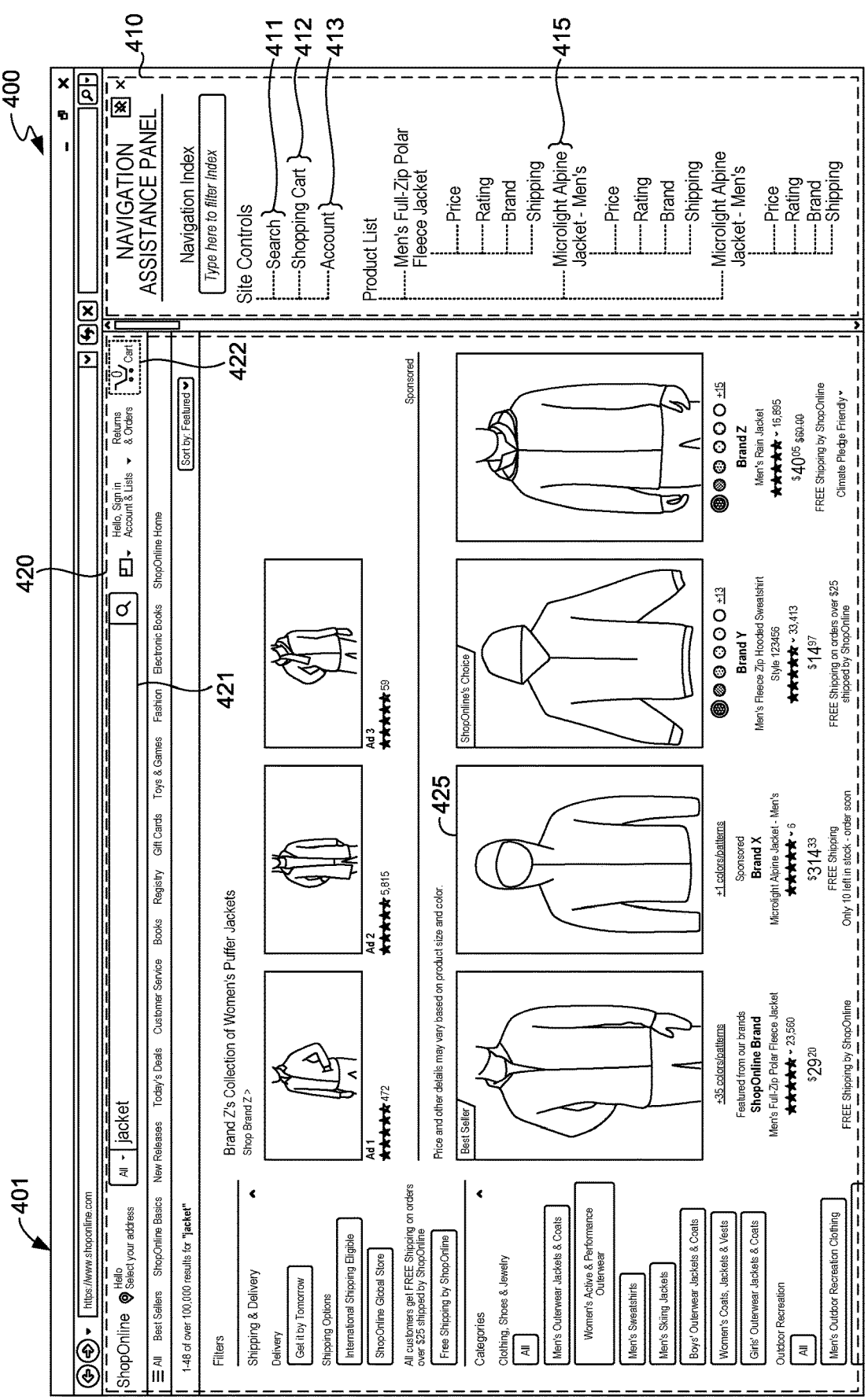
FIG. 4 illustratively depicts an exemplary schematic screenshot from a personal computing device showing aspects of an example graphical user interface, in accordance with an embodiment of the present disclosure.

Some embodiments of panel generator 282 utilize a modified DOM, DOM with feature IDs, or a feature location index of DOM feature IDs for generating controls or other elements of the assistance UI, which may be generated as described previously by site feature extractor 260 and accessed from data structures 244 in storage 225. The modified DOM, DOM with feature IDs, or location index corresponds to the computer resource and can be used to determine location information in the computer resource of the extracted data features for which particular controls are determined by panel generator 282. For example, for a particular control that corresponds to a particular extracted data feature, the DOM index for that extracted data feature is referenced to determine a location in the computer resource that corresponds to the particular control. In this way, the relevant location of a computer resource may be accessed, navigated to, or interacted with, upon a user actuating the particular control corresponding to a data feature extracted from that location. For example, where a user is accessing a shopping webpage, a panel may include a control for navigating to the location of the online shopping cart on the webpage, based on feature ID data, such as from a DOM or feature location index as described above, that includes an index of the location of an extracted data feature for the shopping cart. For instance, with reference to FIG. 4 depicting shopping webpage 420, assistance UI panel 410 includes panel control 412 for "shopping cart." Upon a user selecting (or otherwise actuating) the panel control 412, the corresponding portion of webpage 420, which is the cart element 422, may be determined based on a DOM that includes, at a particular location within the DOM, a feature ID corresponding to the cart element 422 in some embodiments.

Turning back to FIG. 2 and panel generator 282, the particular UI controls of a panel, and in some embodiments, the arrangement of the controls, may be determined based at least in part on the category or sub-category of the computer resource and/or at least a portion of the extracted data features. In this way, the particular controls of the assistance UI panel of these embodiments may be determined based on the contents of the computer resource (i.e., based on the data features extracted from the computer resource) and further based on the category or sub-category of the computer resource. Thus, for example, where the computer resource is a webpage, the particular UI controls of the panel may be determined based on the category of sub-category of webpage; for instance a panel for a shopping webpage will be different than a panel for a banking webpage.

Some embodiments of panel generator 282 utilize a UI template or UI logic, from UI template library 246 of storage 225, for generating aspects of the panel (or for generating another embodiment of an assistance UI). In particular, a UI template comprises a format for a panel (or other embodiment of an assistance UI) that specifies aspects of the UI controls, such as specific UI controls to include, UI-control names (e.g., "shopping cart"), and/or an arrangement of the controls. UI logic comprises instructions or logic for generating the format according to a template, a pre-determined structure, or pre-determined UI-control names. In some embodiments, the UI template comprises an Extensible Markup Language (XML) document, UI logic includes scripts for generating XML, and/or the assistance UI panel comprises a rendered XML document, such as an HTML page, which may be rendered via a browser, viewer application, or other computer service. Some embodiments of panel generator 282 operate in conjunction with presentation component 220, described below.

As described previously, UI controls may correspond to data features (e.g., entities or site components) extracted from the computer resource. Some embodiments of UI logic include instructions for determining a UI-control name based on the data feature corresponding to the panel control. According to some embodiments of the UI logic, for certain types of data features, the UI-control name is determined to be a general name indicative of the type data feature; for example, where the data feature is a shopping basket, the UI-control name may be standardized to the general term "shopping cart." (For example, see item 412 in FIG. 4.) In other instances, for certain types of data features as specified in UI logic, the UI logic may specify determining a UI control name that is specific to or based on the extracted data feature. For example, where the data feature is a product name entity having a specific name of the product, the determined UI control name may include the name of the product. (For example, see item 415 in FIG. 4, which depicts a panel control having a UI control name based on a product name determined from the extracted product name entity data feature.)

Some embodiments of the UI template (or UI logic) are specific to a particular category or sub-category of computer resource. For example, in some of these embodiments, there is a dedicated UI template for a product list page, a UI template for a product details page, a UI template for a purchase page, and the like. In some embodiments, there can be multiple UI templates for a specific category or sub-category of a computer resource. In these embodiments, the particular UI template that is utilized for a particular computer resource may be determined according to UI logic. For example, UI logic may specify determining or selecting a particular UI template based on data features of the resource and/or based on settings determined by the user or administrator. For instance, in one embodiment, having multiple UI templates available for use when the computer resource is a shopping website, the UI logic specifies using a particular UI template for a particular popular shopping website. In these embodiments, the UI logic includes instructions for identifying the particular popular shopping website using data features extracted from the website (e.g., using the domain name or URL of the website), and instructions for subsequently selecting the particular UI template to be used for that shopping website, from among the multiple UI templates available for shopping websites.

Accordingly in some embodiments, at least a portion of the panel controls correspond to certain data features such as specific entities, site components, and other controls of the computer resource, which may be specified in a UI template or UI logic. Advantageously, as a result of utilizing the UI templates or UI logic, these embodiments are configured to promote uniformity in the assistance UI for a particular category or sub-category of a computer resource, such as by configuring the panel controls to have a consistent order or arrangement and consistent UI-control names across similar categories of computer resources. For instance, as described previously, where the category of a particular website accessed by the user is a shopping website, then in one embodiment, the panel may include a control named "shopping cart" even where the particular website uses a different term, such as "shopping basket," "bag" or another term.

Panel UI 284, in general, is responsible for monitoring or detecting user interaction with the assistance UI generated by panel generator 282. Embodiments of panel UI 284 detect a user interaction with the assistance UI, such as the user actuating a control on the panel, and provide information regarding the user interaction. The information regarding the interaction may comprise an indication of the particular control that the user interacted with. The information regarding the interaction may be provided to command generator 286 and/or API caller 288, in some embodiments. In particular, according to some embodiments, when a user interacts with a particular control on the panel (or assistance UI), panel UI 284 detects the interaction with that control and provides an indication of the control. Further, in some instances the indication includes information about the interaction. For instance, in the case of a control that is a slider or text field, panel UI 284 may provide an indication of the control that was interacted with and/or an indication of the interaction or operation of the control, such as the position of the slider or text entered into the text field.

Information regarding the user interaction with the assistance UI may be received as I/O data, in some embodiments. Accordingly, in these embodiments, panel UI 284 receives I/O data from one or more I/O components of a computer system on which the assistance UI is operating, such as an I/O component 820 of computer device 800, described in connection with FIG. 8. In some embodiments, the received I/O data is processed to determine information about the interaction, such as a particular control actuated or operated by the user. By way of example and without limitation, user interaction to actuate a control on an assistance UI may comprise the user's selecting, clicking on, touching (e.g., via a touchscreen display that comprises an I/O component 820, which is an example of display 103a of FIG. 1), invoking, or hovering a cursor over the control element in the assistance UI (such as a hyperlink or button); sliding (such as in the case of a slider); configuring; interacting with; providing an input (such as in the case of a text field) or activating the control provided via the assistance UI, which may include a user providing spoken input to activate a particular control.

Command generator 286, in general, is responsible for determining and issuing a command to perform an operation in response to, and based on, information about an interaction with the assistance UI. Embodiments of command generator 286 can receive information about a user interaction with an assistance UI from panel UI 284. For example, command generator 286 may receive information indicating that the user has actuated a particular panel control. In response to receiving the indication, command generator 286 generates a command or determines an operation to be performed.

In some embodiments, the command or operation is generated or determined by command generator 286 based on a particular assistance UI control. Additionally or alternatively, the command or operation may be predetermined or determined, at least in part, based on settings configured by the user or administrator, as described further herein. The command or operation may be directed towards an aspect of the computer resource that corresponds to the indicated assistance UI control that was interacted with. For example, the command may be directed towards (or the operation may be performed in association with) a corresponding control element that is present in the computer resource; a corresponding aspect or element of the computer resource content; or a portion of the computer resource content that corresponds to the control indicated as being interacted with. Accordingly, in response to the command, an operation may be performed to: control an aspect of the computer resource (e.g., a webpage or website) corresponding to the actuated assistance UI control; navigate to a specific aspect of the computer resource corresponding to the actuated assistance UI control; or carry out other operations associated with an aspect of the computer resource corresponding to the actuated assistance UI control.

Some embodiments of command generator 286 utilize a modified DOM or DOM with feature IDs described previously (or utilize an index of the locations of data features of the computer resource) in order to determine a specific aspect of the computer resource that a command is directed to, or an aspect of the computer resource on which an operation is performed or is associated with. In this way, based on an actuated control in the assistance UI, command generator 286 uses the modified DOM or DOM with feature IDs (or a similar index of elements of the computer resource) to locate an aspect of the computer resource corresponding to the actuated assistance UI control, such that the command is directed to that aspect, controls that aspect, or an operation is performed that is associated with that aspect of the computer resource. For example, according to one embodiment where the computer resource is a shopping webpage and a user has actuated a shopping cart control in an assistance UI panel, upon receiving an indication that the shopping cart control has been actuated (which may be received from panel UI 284) command generator 286 determines a command to set the focus of the browser to the shopping cart control element on the webpage. More specifically, command generator 286 determines the location of the shopping cart control element on the webpage, such as by using the DOM (e.g., a modified DOM or DOM with feature IDs), and subsequently determines the command to set the focus. Alternatively, in another embodiment, command generator 286 may issue a command to navigate the browser to the shopping cart webpage, which may be determined based on a location of the shopping cart webpage specified by the shopping cart control element (for instance, as a hyperlink).

Where the indication of a user interaction received from panel UI 284 indicates the user has actuated a panel control, some embodiments of command(s) generator 286 facilitate routing or communicating a specific command to a particular component responsible for: operating a control, or responsible for controlling an element or portion of the computer resource corresponding to the actuated control. For example, command generator 286 may communicate a command to the browser or to the browser engine, as described in connection with FIG. 3. Accordingly, in the previous shopping example wherein an embodiment of command generator 286 determines a command corresponding to the shopping cart control, based on an indication that the user has actuated the shopping cart panel control, command generator 286 sends the command to the browser engine. The browser engine performs an operation to set the focus on the shopping cart control on the webpage. Or, in the alternative example embodiment described previously, the browser engine navigates to the shopping cart webpage. Thus, the user's actuating of the shopping cart control in the assistance UI panel has the same result—navigating the browser to the shopping cart webpage—as if the user had actuated the shopping cart control on the shopping webpage. For instance, with reference to FIG. 4 in this alternative example embodiment, a user actuating the shopping cart control 412 in panel 410 results in navigating the browser to the shopping cart webpage, which is the same result as would occur if the user had clicked on the shopping hyperlink that is cart control element 422, on webpage 420.

Specific commands generated or determined and issued by command generator 286 may comprise various instructions, program or service calls, or operations to be carried out in connection with accessing or using the computer resource. In some embodiments, and where the computer resource is a webpage, a command comprises a script that is injected into the actual DOM of the webpage, such that executing the script (e.g., by the browser or viewer application) facilitates causing performance of an operation. Similarly, in some embodiments the command comprises a script or a similar computer program routine, which may be injected into an XML document corresponding to the computer resource, in some implementations, and/or which may be executed by a computer application for presenting aspects of the computer resource, such as a viewer application. Alternatively or in addition, in some embodiments, a command comprises an API call to the browser, viewer application or other program operating on the computer system. For example, in some embodiments, a command comprises an API call to a screen reader program or other assistive computer program operating in conjunction with the browser or viewer application.

By way of example and without limitations, a command may comprise performing operations to: set the focus; navigate to a different aspect of the computer resource or to a different computer resource; activate a control on the computer resource; conduct a search query; filter or configure aspects of the computer resource that are presented; or performing other operations associated with the computer resource. As further examples, with regard to setting the focus, a focus may be set on a specific DOM element of the actual DOM of the computer resource such as the search input, a specific link, a block of text, or button. For example, with reference to FIG. 4, upon a user actuating panel control 412 for "shopping cart," a command issued by command generator 286 may result in operations being performed to set the focus on cart element 422 of webpage 420. Similarly, upon a user actuating panel control 411 for search, a command issued by command generator 286 may result in operations being performed to set the focus on the text field of search bar element 421 of webpage 420. Further, subsequent to actuating the search panel control 411, the cursor may be placed in the text field of search bar element 421 such that the user can type in a search query term. In some implementations where the command causes operations to be performed to bring focus to an aspect of the computer resource such as an element of a webpage, the operations comprise calling an API (or similar function of a browser or viewer application) and passing a parameter comprising an identifier of the element to be focused on. The element identifier may be determined using the modified DOM, DOM with feature IDs, or a similar index of elements or data features of the computer resource), such as an index of locations of elements in the DOM corresponding to extracted data features, which may be determined by a site feature extractor 260.

With regard to navigating, this type of command causes the browser (or viewer application) to navigate to a different aspect of the computer resource or to a different computer resource, such as a different webpage of a website or a different website. For example, causing the browser to navigate to a different webpage corresponding to a panel control actuated by the user, such as navigating to the shopping cart webpage subsequent to the user actuating a panel control for the shopping cart. With regard to activating a control on the computer resource, the control may comprise a button or similar user input on the computer resource, such as a "purchase" button on a shopping website. With regard to conducting a search query, where an assistance UI includes a control that is a text field for performing a search query, the command may comprise performing the search query, such as by passing a value entered into the text field panel control (i.e., the user's search term) to the browser. Alternatively, the command may comprise performing operations to enter the value of the text field panel control (i.e., the user's search term) into the corresponding query control on the webpage. In some instances, the command may further comprise activating a search button on the webpage for performing the query. With regard to filtering or configuring aspects of the computer resource that are presented, the command may comprise performing operations to activate a filter control or a configurations control on the computer resource, such as a filter button on webpage. Alternatively, the command may comprise performing operations on the actual DOM of the computer resource (or a similar XML document of the computer resource) to cause the presentation of the resource to be modified. For example, where a user has actuated a control in the assistance UI panel for filtering content, the command may cause operations to be performed (e.g., by the browser or viewer application) to filter content of the computer resource that is presented to the user in accordance with the actuated control. With regard to performing other operations associated with the computer resource, in some embodiments, the command comprises setting the focus on a particular element of the computer resource (such as an element corresponding to the actuated panel control of the assistance UI) and then performing an operation on the element or performing an operation associated with the element. For instance, highlighting the element, modifying presentation of the element, copying the element, or other operation. More specifically, according to some embodiments where a focus on an element of the computer resource is determined in response to a user actuating an assistance UI control that corresponds to the in-focus element, a further operation may be performed to present an indicator proximate the element or associated with the element. By way of example and without limitation, the indicator may comprise a visual cue such as a highlight; change in color of the element; colored perimeter or boundary; enlargement of the element; colored marking or icon; causing the element to blink, flash, vibrate, move, or changing a visual characteristic of the element; or similar visual indicator. Alternatively or in addition, the indicator may comprise a tactical indictor corresponding to the location of the focus on the webpage; or an audio indication such as a word or description of the element in focus. In this way, the user is further assisted in identifying the portion of the computer resource that corresponds to the actuated assistance UI control.

In some embodiments, a setting or adjustable configuration associated with the assistance UI controller 280 can determine a particular command generated or determined by command generator 286, or a setting can determine specific operations that may be performed via the command. The setting may be configurable by the user or by an administrator. For example, a setting may specify whether actuating a particular assistance UI control merely sets the focus to an element of the webpage corresponding to the actuated control, or activates or performs the control in a manner similar to as if the user had actuated a control on the computer resource (e.g., a webpage) rather than actuating a control in the assistance UI. For instance, with reference to FIG. 4, based on a first setting configuration, a user actuating panel control 412 for "shopping cart" may cause the focus of shopping webpage 420 to be set on cart element 422, and based on a second setting configuration, a user actuating panel control 412 for "shopping cart" may cause a browser (depicted in screenshot 401) to navigate away from webpage 420 to a different webpage comprising the shopping cart webpage.

API caller 288, in general, is responsible for calling an API subsequent to and based on information about an interaction with the assistance UI. API caller 288 may be used in some implementations of technologies described herein wherein APIs are called, such as APIs to the browser, viewer application, assistive technology such as screen readers, or another computer program operating in conjunction with an embodiment of an assistance UI. For example, in some embodiments, subsequent to a user actuating a particular control on an assistance UI, an API call to set the focus on an element of the computer resource (such as described previously) may be performed by API caller 288. Embodiments of API caller 288 can receive information about a user interaction with an assistance UI from panel UI 284, and in some instances may receive aspects of a command or operation(s) to be carried out from command generator 286.

Some embodiments of API caller 288 determine an API to call from one or more APIs associated with the computer browser, a computer resource, other assistive technology operating on the user computer device, or other computer applications or services operating in connection with the user computer device. For instance, in one embodiment the APIs may be determined from APIs supported for browser extensions such as a Microsoft Edge browser extension. Further, in one embodiment at least a portion of the APIs that can be called by API caller 288 comprise APIs supported by the Microsoft Shopping Assistant browser extension. In some embodiments, API caller 288 (and in some implementations, assistance UI controller 280) is implemented as functionality of a web browser, such as a navigation assistant feature or an accessible browser assistant feature of the browser application. In some of these embodiments, the APIs are determined from APIs supported by this feature of the browser.

Some embodiments of API caller 288 determine parameters to pass to an API call. For example, the API call parameters may comprise one or more of data indicating a particular control on an assistance UI that was actuated; an element of a computer resource associated with the actuated control (e.g., a data feature of a webpage on which to set the focus in response to the user actuating a panel control corresponding to the data feature); information about the user computer device including information about applications running or installed on the computer device; information associated with a computer resource; user data or configuration preferences; or other parameters. Some embodiments of API caller 288 operate with command generator 286. For example, command generator 286 may determine a command that is subsequently carried out as an API call.

As described previously, some embodiments of the assistance UI are configured to operate with other assistive technologies and in so doing improve the operation of these assistive technologies. In some of these embodiments, API caller 288 is used to facilitate control of the assistive technologies. For example, one embodiment of the assistance UI is configured to operate in conjunction with an assistive technology that is a screen reader program. Upon accessing a computer resource such as a webpage, API caller 288 may issue an API call to the screen reader (or to another program operating with the screen reader, such as a browser) to first read the assistance UI panel before reading contents of the computer resource (e.g., a webpage). In some embodiments, this API call comprises setting the initial focus of the browser (or viewer application) to the assistance UI. In this way, via the combined operation of the assistance UI and screen reader program, a user can more easily and consistently navigate and interact with the webpage. Similarly, in response to actuating a particular assistance UI control, some embodiments of API caller 288 issue an API call to another assistive technology, thereby improving the functionality of the other assistive technology by enabling it to carry out an operation associated with the actuated assistance UI control. For example, an API call may be made to a screen reader program to provide the focus of an aspect of the website corresponding to the actuated control. Subsequent to receiving the focus information via the API call, the screen reader reads the aspect of the website corresponding to the actuated control.

As described previously, the assistance UI provided by assistance UI controller 280 may be implemented in a variety of ways, according to the various embodiments of the disclosure, including variations in the format, contents, and operation. For example, although an assistance UI panel is described in connection with example system 200, some embodiments of assistance UI controller 280 utilize an index of UI controls. Each control (or some of the controls) of the index of controls corresponds to a data feature (e.g., an entity) of the computer resource, which may be indexed to a DOM, as described previously. The index of UI controls may be embodied as a data structure, such as a table of the UI controls, or a library of UI controls, for example. Embodiments of this index of UI controls may be utilized by a virtual assistant, such as a virtual assistant operating on a smart speaker device, to provide an interactive user interface with a user via voice commands. For example, a voice command can be used to actuate a particular UI control. In this way, a user may access and interact with the computer resource by speaking commands (corresponding to indexed UI controls) to the virtual assistant.

Yet another embodiment of the assistance UI that utilizes the index of UI controls, and which may be provided by an embodiment of assistance UI controller 280, is a smart television user-interface. For instance, this assistance UI may be embodied on the television device or operate on a device that connects to a television, such as a streaming media device or stick. In these embodiments, the computer resource for which the assistance UI facilitates access may comprise entertainment media available to be consumed by the user. Similar to the smart speaker embodiment described previously, this embodiment of the assistance UI can provide an interactive user interface for a user via voice commands. Further, some embodiments of this assistance UI for a television present a UI panel, such as described herein, and may be configured to receive voice commands, touch input, or input from a controller such as a remote control, computer mouse, or similar user-input device. For example, the panel may present panel controls that can be actuated by selecting a particular control using the television remote control or via a voice command. Further still, some embodiments may provide the panel on a second device, such as a smart phone or smart television remote control.

Continuing with example system 200 and in reference to FIG. 2, example system 200 also includes a presentation component 220 that is generally responsible for causing content to be presented including aspects of a computer resource or aspects of an assistance UI (for those embodiments wherein the assistance UI is provided as a visual user interface). For example, presentation component 220 can present aspects of an assistance UI panel determined by assistance UI controller 280. The content may be presented via one or more presentation components 816, as described in FIG. 8, and/or via a display 103*a* described in FIG. 1.

Some embodiments of presentation component 220 work in conjunction with assistance UI controller 280 or its subcomponents to facilitate presentation of an assistance UI. For example, presentation component 220 may facilitate presenting an embodiment of an assistance UI panel in a side bar of a browser that is also presenting aspects of a computer resource, such as a webpage. Some embodiments of presentation component 220 are further responsible for (or facilitate) rendering aspects of the computer resource for presentation on a user device, which may include processing an XML document (e.g., a DOM) corresponding to the computer resource. In particular, various embodiments of presentation component 220 can facilitate the presentation, via a graphical user interface ("GUI"), of aspects of an assistance UI and computer resource, such as illustratively shown in FIGS. 4 and 5A-5I (discussed further below). Presentation component 220 may also generate user interface features associated with or used to facilitate presenting assistance UI, (such as the assistance UI panels shown in connection with FIGS. 4 and 5A-5I). Such features can include interface elements (such as icons or indicators, graphics buttons, sliders, menus, audio prompts, alerts, alarms, vibrations, pop-up windows, notification-bar or status-bar items, in-app notifications, or other similar features for interfacing with a user), queries, and prompts.

Presentation component 220 may comprise one or more computer applications or services on a user device, across multiple user devices, or in the cloud. For example, in one embodiment, presentation component 220 manages the presentation of a computer resource or aspects of an assistance UI to a user across multiple user devices associated with that user. In some embodiments, presentation component 220 is implemented as part of another computer application, such as a browser or viewer application. Some embodiments of presentation component 220 determine on which user device(s) content of a computer resource or an assistance UI is presented, how and/or how much content is presented, and/or which aspects are presented. For instance, this determination may be made based upon the user device's screen size, the type of presentation device, and/or user-device settings.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes site classification logic 230 and feature extraction logic 235, as described previously. Storage 225 also includes computer resource classifications 242, which comprises computer resource classifications and contextual information determined by site classifier 250; data structures 244, which stores data structures of data features that are extracted from a computer resource determined by feature data-structure generator 270, and may also include DOM data for the computer resource, such as a modified DOM, DOM with DOM IDs that may be used for feature IDs of extracted features, feature location index, or other DOM data; and UI template library 246, which comprises one or more UI templates or UI logic that may be utilized by panel generator 282, assistance UI controller 280, or other components of example system 200, to generate or control an assistance UI.

Some embodiments of storage 225 also include settings or user preferences (not shown) for various embodiments described herein. By way of example and not limitation, such settings may include user configurations or preferences about the various thresholds described herein, confidence values associated with inferences such as data features inferred by an embodiment of site feature extractor 260; settings regarding operations to be performed or commands to be issued subsequent to a user actuating an assistance UI control, such as setting the focus versus navigating, as described previously; computer resource classification settings; settings or preferences for generating or presenting an assistance UI, such as a preferred location of an assistance UI panel; or other settings or configurations of computer applications services, or devices associated with the embodiments described herein.

Figure 3:
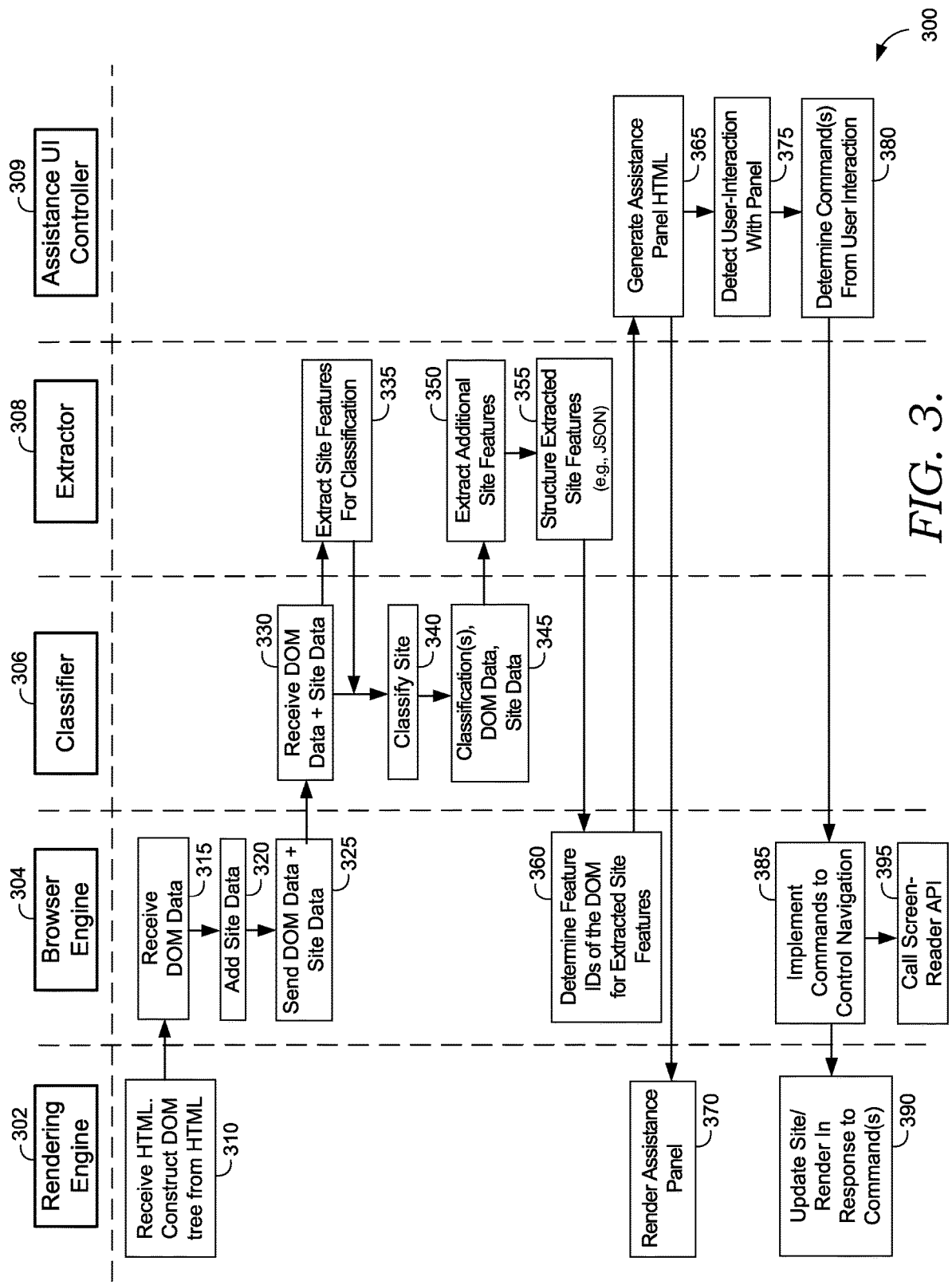
FIG. 3 depicts an example component process flow, in accordance with an embodiment of the present disclosure.

Turning to FIG. 3, an example component process flow 300 is illustratively depicted. Example component process flow 300 shows an aspect of generating and providing an assistance UI that is a panel for a computer resource that is a webpage. Example component process flow 300 represents only one example implementation of a process flow for providing and operating an assistance UI in accordance with embodiments of this disclosure. Other, different arrangements or components can be used in addition to or instead of those shown, and some elements may be omitted altogether for the sake of clarity.

Component process flow 300 depicts operations performed by five components including rendering engine 302, browser engine 304, classifier 306, extractor 308, and assistance UI controller 309. In some embodiments, rendering engine 302 and browser engine 304 are components of a web browser computer application, and classifier 306, extractor 308, and assistance UI controller 309 are components of a browser extension, browser or viewer plug in, or a standalone computer application. Further, some embodiments of classifier 306, extractor 308, and assistance UI controller 309 may be implemented as site classifier 250, site feature extractor 260, and assistance UI controller 280, respectively. Additional details of embodiments of classifier 306, extractor 308, and assistance UI controller 309 are described in connection to FIG. 2, and, in particular, site classifier 250, site feature extractor 260, and assistance UI controller 280, respectively.

Component process flow 300 starts at block 310, where rendering engine 302 receives HTML for the webpage that is the computer resource, and subsequently constructs a DOM tree from the HTML. The DOM may include various elements or nodes, and in some embodiments further includes identifiers for the DOM elements or nodes, such as site features (sometimes referred to herein as feature IDs). For instance, some implementations include a unique IDs in the DOM at elements or nodes corresponding to site features of the webpage. At block 315, browser engine 304 receives DOM data from the constructed DOM tree. In some embodiments, the DOM data includes the DOM (or a portion thereof) or the feature IDs (or a portion thereof). At block 320, browser engine 304 adds site data, such as domain information, URL, or other data regarding a webpage that is the computer resource. At block 325, the DOM data and site data are sent to classifier 306 and received at block 330. In some embodiments, the DOM data and site data may be sent to site classifier 306 as a function call or API call. At block 335, at least a portion of the DOM data and site data is provided to extractor 308, which extracts a first set of site features (e.g., data features) from the webpage, and provides extracted site feature data to classifier 306. In some embodiments, the feature IDs from the DOM data corresponding to the extracted features are provided to classifier 306 along with the DOM or one or more portions thereof.

At block 340, classifier 306 classifies the site using the extracted site features, in some instances using the DOM data and/or site data. As described previously, in some embodiments, portions of the DOM are tokenized, such as particular extracted features, and input to a classifier model. Further, in some implementations, a feature ID is included in a token as another attribute of a feature or data to facilitate the classification. For instance, a particular feature ID (or a string of IDs) may be appended to a token corresponding to the particular feature (or features). At block 345, classifier 306 provides the classification(s), DOM data, and site data to extractor 308. At block 350, extractor 308 extracts additional site features (e.g., data features) from the webpage. For example, as described herein, one or more entity extraction models may be employed to extract particular site features. In some embodiments, additional site content or other data associated with a particular extracted site feature are also extracted at block 350. At block 355, the extracted site features (and other extracted content, in some embodiments) are structured in a data structure, such as a JSON structure.

At block 360, based on the extracted site features, browser engine 304 determines feature IDs of the DOM for the extracted site features. For instance, DOM IDs or DOM node identifiers, such as unique identifiers that allow for the identification of DOM elements, are determined for the extracted site features. In this way, the location in the webpage (or computer resource) of a particular extracted site feature can be determined based on the feature ID of the particular site feature. Alternatively, in another embodiment (not shown), based on the extracted site features, browser engine 304 determines a modified DOM using identifiers for the extracted site features. For instance, the webpage DOM may be modified by inserting identifiers for the site features at the locations of the DOM where site features are extracted. In this way, the modified DOM may be used to determine the location (via the data feature identifiers) of extracted site features on the webpage.

At block 365, assistance UI controller 309 generates HTML code for an assistance UI panel. In some embodiments, the extracted site features, corresponding feature IDs, and/or aspects of the DOM are utilized by the assistance UI controller 309 for generating the HTML code. For example, the assistance UI panel—and in particular panel controls—may be generated using the feature IDs in the DOM indicating location information of extracted site features (e.g., data features), as described herein. Alternatively, in some embodiments, the assistance UI panel and/or panel controls are generated using the modified DOM or location information for extracted site features, as described herein. At block 370, the HTML code generated at block 365 is used by rendering engine 302 to render an assistance UI panel. At block 375, assistance UI controller determines (or receives an indication of) user interaction with the assistance UI panel. For example, the interaction may comprise the user actuating a panel control. At block 380, one or more commands are determined, based on the user interaction. The one or more commands are routed to browser engine 304. At block 385, browser engine 304 implements commands to control navigation of the webpage. For example, the focus may be set on a particular element of the webpage or the browser may be instructed to navigate to a new webpage or portion of the existing webpage. More specifically, implementing the command(s) may comprise an http request to fetch a new webpage from a server. At block 390, rendering engine 302 updates the webpage in response to the command. For example, where the command comprises navigating to a new webpage, rendering engine 302 receives HTML for the new webpage and renders it to be presented. Similarly, if the command comprises setting the focus or navigating to a different portion of the existing webpage, rendering engine 302 updates the aspect of the webpage presented to the user accordingly. At step 395, browser engine 304 calls an API for a screen reader. The API call may include parameters such as the focus of the webpage or an aspect of a new webpage. In this way, the screen reader is directed to provide audio according to the API call parameters. For example, where the API call parameter comprises a location of the webpage to set the focus, the screen reader will generate an audio reading starting at the focused location of the webpage.

With reference now to FIGS. 4, and 5A-5I, a number of exemplary schematic screenshots from a personal computing device are illustratively depicted that show example graphical user interfaces for assistance UI panels associated with a computer resource that is a webpage. Aspects of the assistance UI panels and the computer resource depicted in FIGS. 4, and 5A-5I may be determined and presented as described in connection with the components of system 200 of FIG. 2.

Turning to FIG. 4, an exemplary schematic screen display 400 is shown, which represents a computing device, such as user device 102*n*, discussed above with respect to FIG. 1. Screen display 400 is shown depicting a screenshot 401 of a web browser computer application, such as the Microsoft Edge browser. The browser of screenshot 401 depicts a webpage 420, which is an example of a computer resource, as described herein. Webpage 420 comprises a shopping webpage, which may be one webpage within a shopping website or presented to the user when visiting a shopping website and browsing particular products to purchase. More specifically, webpage 420 comprises a product listing webpage showing various products available to be purchased, such as the "microlight alpine jacket-men's" depicted at item 425. In this example, the computer resource that is webpage 420 may not exist until the user performs a search query for a particular category of product, here "jacket" as indicated in the search bar element 421. Webpage 420 includes a number of elements, such as cart element 422 and search bar element 421. In some instances, an element of the webpage (or more generally, an element of the computer resource) may also be a webpage control (or more generally, a control of the computer resource), such as a button, hyperlink, search bar, or other webpage controls as described herein.

The browser of screenshot 401 further depicts an example assistance UI panel 410, which is provided proximate the computer resource as a sidebar, in this example embodiment. The assistance UI panel 410 can be determined or generated by an assistance UI controller 280, such as described in connection with FIG. 2. Assistance UI panel 410 includes a number of panel controls, which may be determined as described in connection with panel generator 282 (FIG. 2), such as panel control 412 for a shopping cart, panel control 415 corresponding to a product depicted on the product listing webpage 420, and panel control 411 for conducting a search. In particular, a portion of the panel controls each correspond to controls on the webpage. For instance, panel control 412 for a shopping cart corresponds to the cart element 422, which is a hyperlink for accessing a shopping cart webpage showing items in the user's shopping cart. Similarly, search panel control 411 corresponds to the search bar element 421, which is a webpage control for conducting a search of products for sale on the shopping website. In the example of FIG. 4, assistance UI panel 410 also includes several panel controls that correspond to controls on the shopping website, such as search panel control 411 (described previously) and account panel control 413 for accessing a shopping account or payment account associated with the user. These panel controls are utilized for accessing or navigating aspects of the shopping website, and may correspond to webpage controls that are common to all pages of the website or which may not be present on particular pages of the website. The particular controls of assistance UI panel 410 and/or the arrangement of controls may be determined according to a UI template or UI logic, as described herein. For example, as the computer resource depicted in exemplary schematic screen display 400 is a shopping webpage for a listing of products, a UI template (or UI logic) corresponding to this type of computer resource (i.e., a product listing webpage) may be used by panel generator 282 (FIG. 2) to construct the assistance UI panel 410.

With reference to FIGS. 5A-5I, various aspects of an exemplary schematic screen display 500 are shown, which represent a computing device, such as user device 102*n*, discussed above with respect to FIG. 1. Screen display 500 is shown depicting a number of screenshots 501-509 of a web browser computer application, which are depicted in FIGS. 5A-5I, respectively. Each of screenshots 501-509 depict various aspects of a webpage 520, which is an example of a computer resource, as described herein. Each of screenshots 501-509 further depict aspects of an example assistance UI panel 510 which is presented proximate the computer resource as a sidebar in the browser application, in this example embodiment. The assistance UI panel 510 can be determined or generated by an assistance UI controller 280, such as described in connection with FIG. 2. Assistance UI panel 510 includes a number of panel controls, which may be determined as described in connection with panel generator 282 (FIG. 2). In particular, some of the panel controls of example assistance UI panel 510 are presented according to a hierarchical arrangement. For example, with reference to FIG. 5A, assistance UI panel 510 includes panel control 514, panel control 515, and panel control 516, wherein panel control 515 is a level below panel control 514, and panel control 516 is a level below panel control 515. This particular arrangement indicates that panel control 516 is associated with panel control 515, and that panel control 515 is associated with panel control 514. This example arrangement of assistance UI panel 510 can be determined according to a UI template or UI logic, from UI template library 246, described in connection with FIG. 2.

Figure 5A:
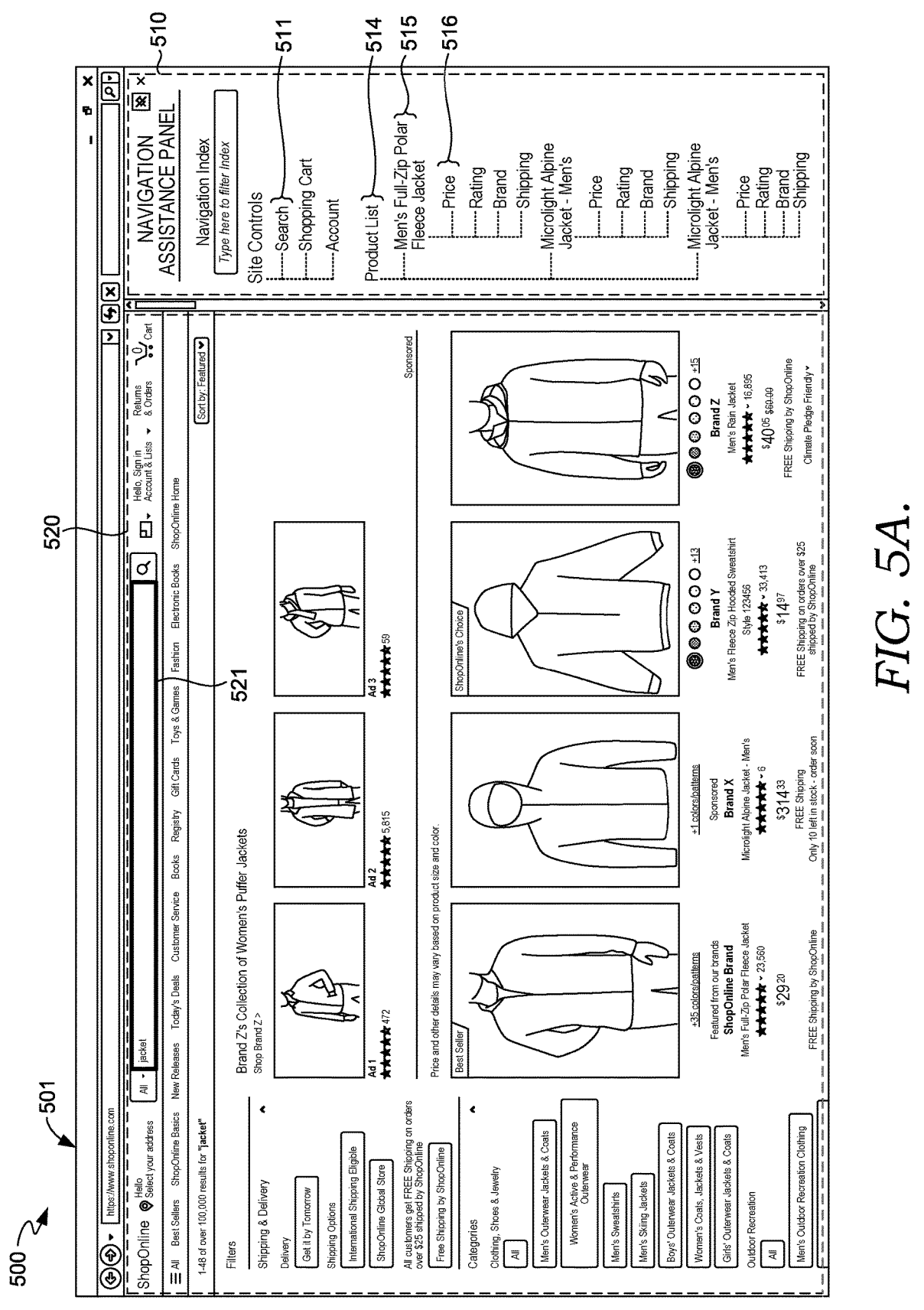
Figure 5B:
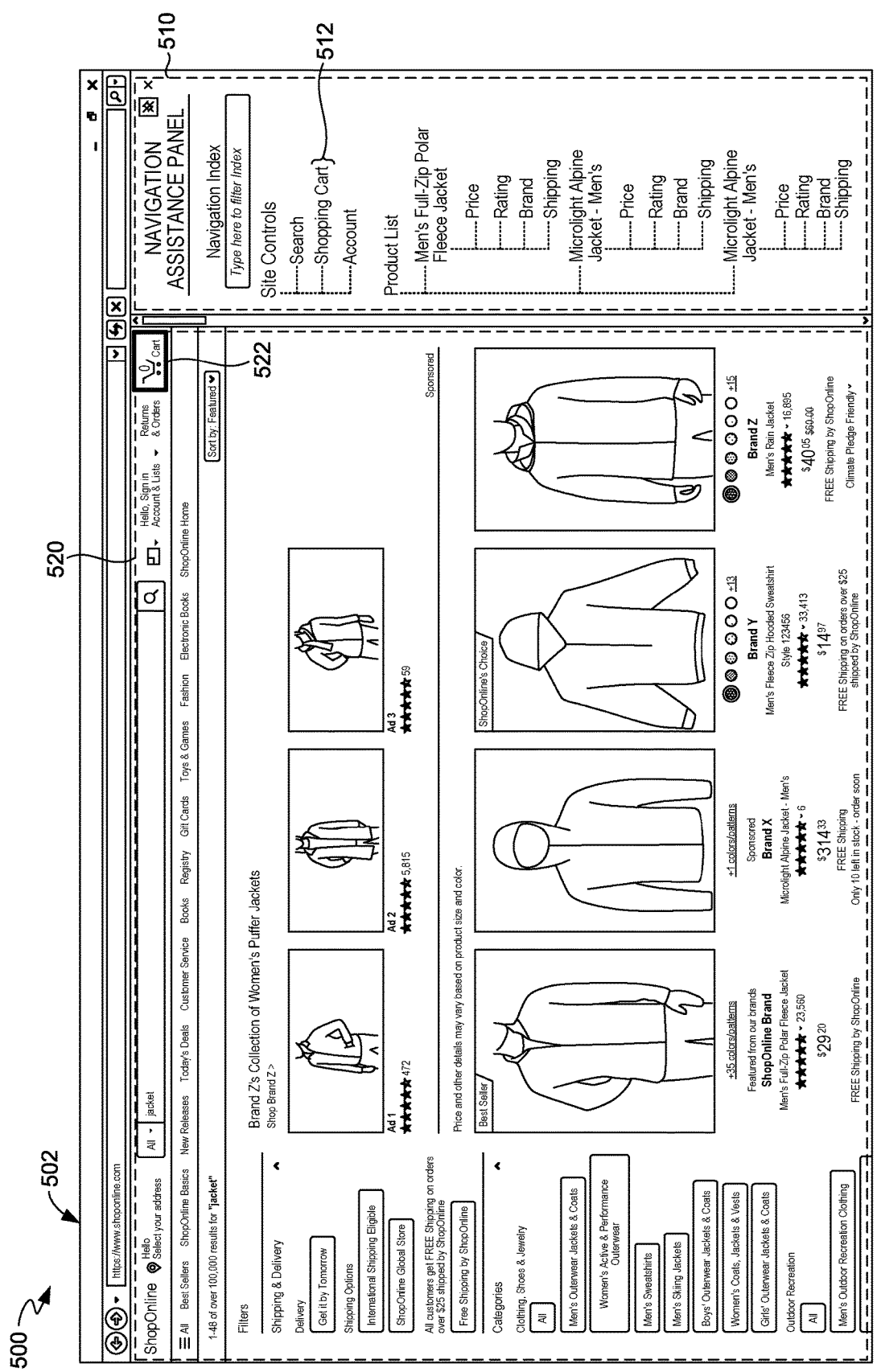

Continuing reference to FIGS. 5A-5I, each aspect of assistance UI panel 510 shown in screenshots 501-509 depicts a particular panel control that facilitates controlling access to a corresponding, particular control or element of the computer resource that is webpage 520 in this example. Turning to FIG. 5A, screenshot 501 depicts a panel control 511 that is a "search" control. Panel control 511 corresponds to search bar element 521 of webpage 520, which is a webpage control for conducting a search of products for sale on the shopping website. Panel control 511 can be actuated for accessing (or performing an operation associated with) search bar element 521. For example, actuating panel control 511 causes the focus of webpage 520 to be set on search bar element 521 in one embodiment.

Turning to FIG. 5B, screenshot 502 depicts a panel control 512 that is a "shopping cart" control. Panel control 512 corresponds to cart element 522 of webpage 520, which is a hyperlink for accessing a shopping cart webpage showing items in the user's shopping cart. Panel control 512 can be actuated for accessing (or performing an operation associated with) cart element 522. For example, in one embodiment, actuating panel control 512 causes the focus of webpage 520 to be set on cart element 522. Alternatively, in another embodiment, actuating panel control 512 causes the browser to navigate to a different webpage that is the user's shopping cart webpage, as though the user had actuated the hyperlink of cart element 522.

Figure 5C:
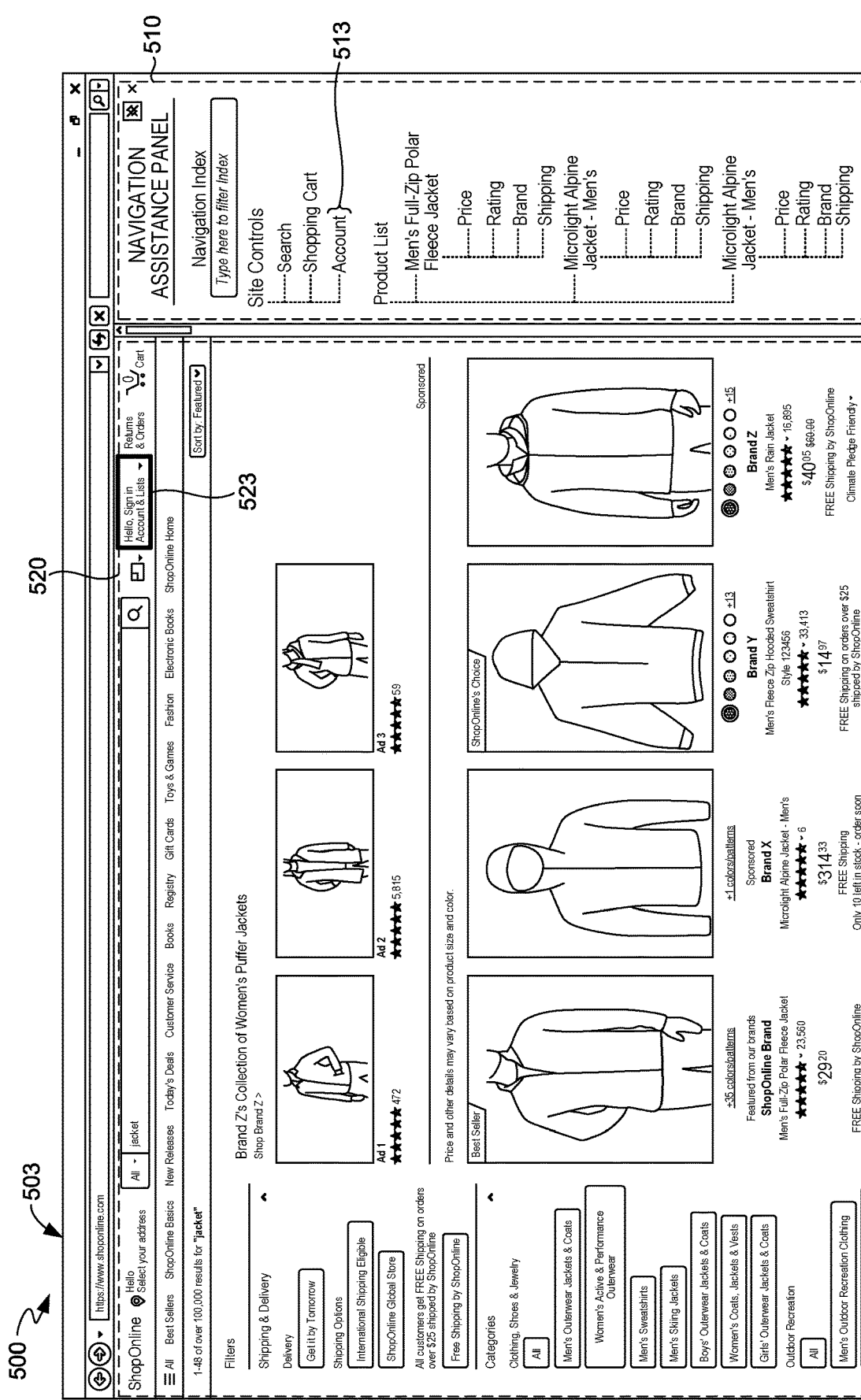

Turning to FIG. 5C, screenshot 503 depicts a panel control 513 that is an "account" control. Panel control 513 corresponds to account element 523 of webpage 520, which is a dropdown menu of hyperlinks for accessing shopping account or payment account information associated with the user. Panel control 513 can be actuated for accessing (or performing an operation associated with) account element 523. For example, in one embodiment, actuating panel control 513 causes the focus of webpage 520 to be set on account element 523. Alternatively, in another embodiment, actuating panel control 513 causes the browser to actuate account element 523, which may cause the dropdown menu to appear to be presented as though the user had actuated account element 523.

Figure 5D:
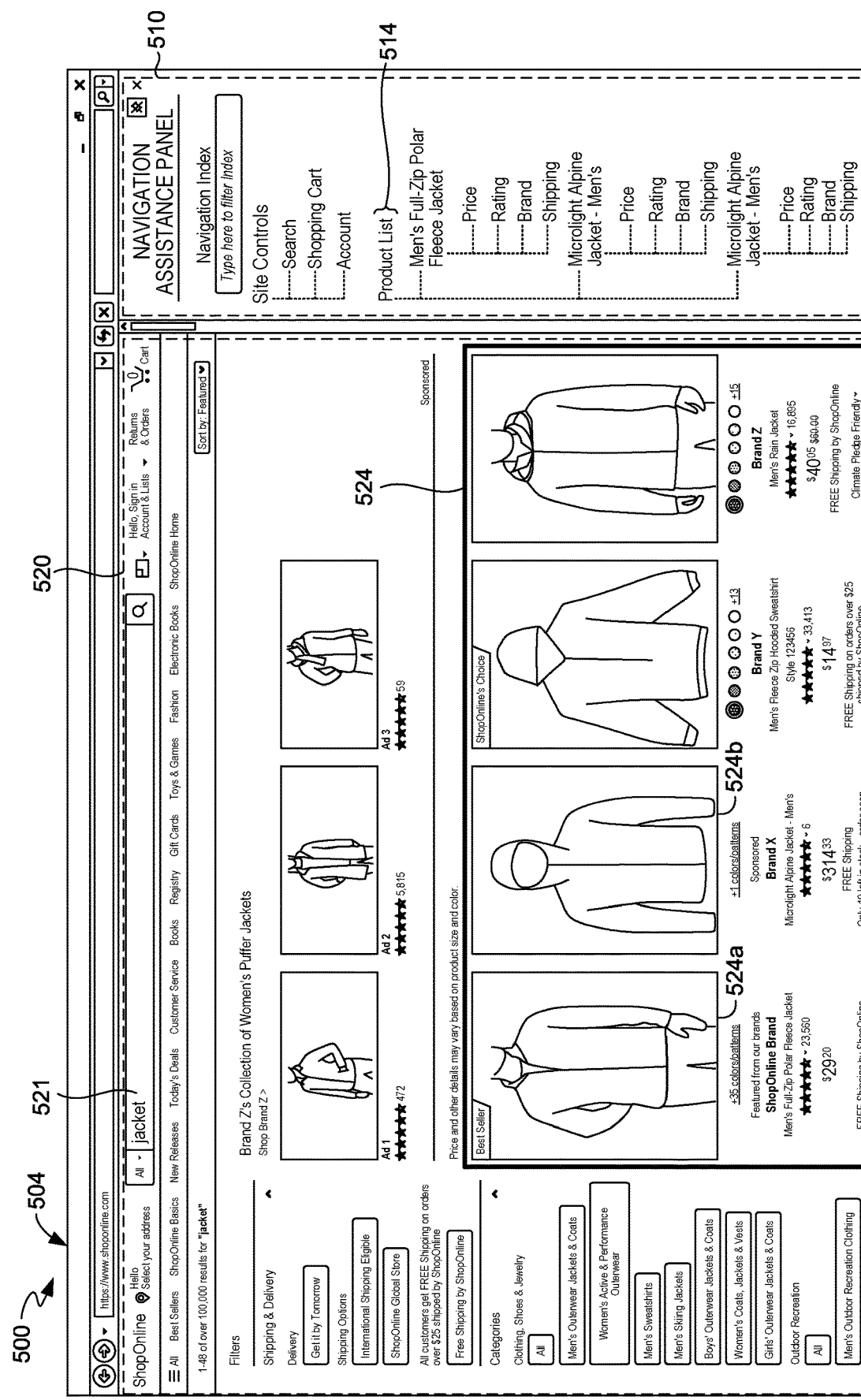

Turning to FIG. 5D, screenshot 504 depicts a panel control 514 that is a "product list" control. Panel control 514 corresponds to product list portion 524 of webpage 520, which displays a number of products available to purchase via the shopping website. The products listed within product list portion 524 may be determined as a result of a user search query in search bar element 521. For instance, in this example, the search term "jacket" shown in search bar element 521 has resulted in a number of jackets (e.g., jackets 524a and 524b) that are available for purchase, presented within product list portion 524. Panel control 514 can be actuated for accessing (or performing an operation associated with) product list portion 524. For example, in one embodiment, actuating panel control 514 causes the focus of webpage 520 to be set on product list portion 524.

Figure 5E:
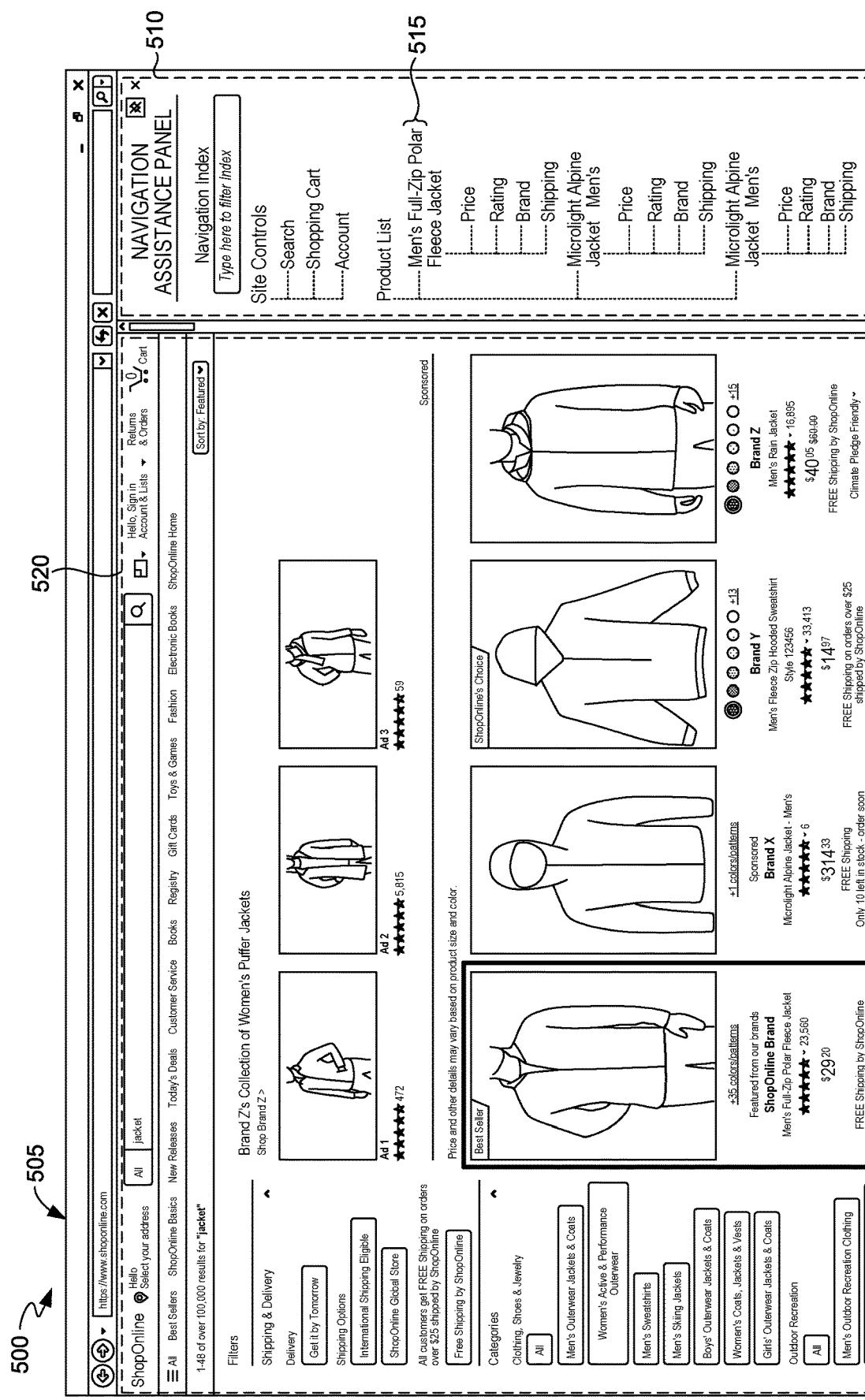

Turning to FIG. 5E, screenshot 505 depicts a panel control 515 that is a control for an element of webpage 520 that is a particular product, "Men's Full-Zip Polar Fleece Jacket." Panel control 515 corresponds to the product listing portion 525 of webpage 520, which displays a product and information associated with the particular product, such as a description, price, and customer rating. Panel control 515 can be actuated for accessing (or performing an operation associated with) product listing portion 525. For example, in one embodiment, actuating panel control 515 causes the focus of webpage 520 to be set on the product listing portion 525. Alternatively, in another embodiment, actuating panel control 515 causes the browser to navigate to a different webpage that is a product description webpage for the product shown in product listing portion 525.

Figure 5F:
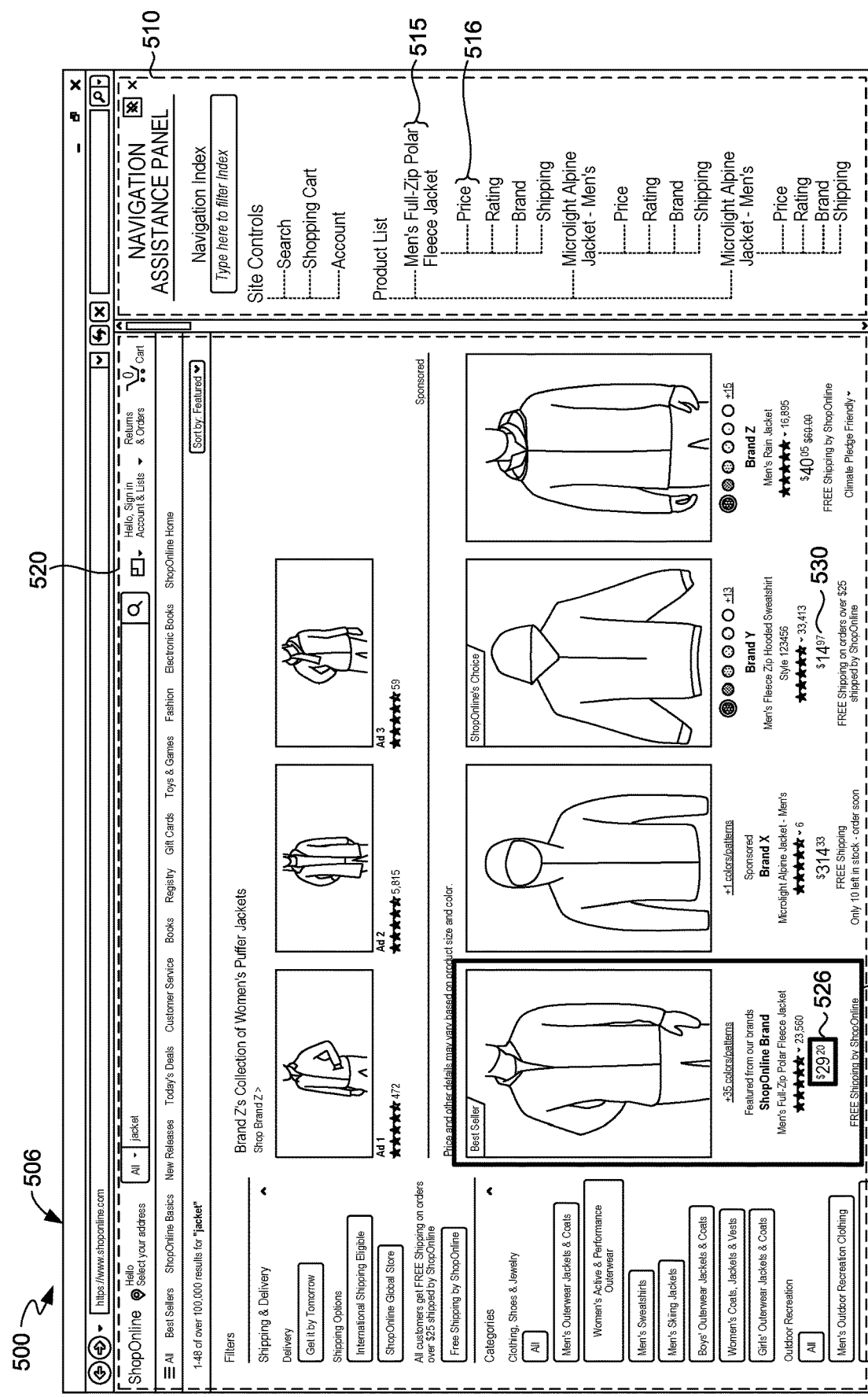

Turning to FIG. 5F, screenshot 506 depicts a panel control 516 that is a control for an element of webpage 520 that shows price information for a particular product identified in product listing portion 525. In particular, the hierarchical arrangement of panel control 516 indicates that this price information is associated with the product corresponding to panel control 515, which is the "Men's Full Zip Polar Fleece Jacket" identified in product listing portion 525. Panel control 516 thus corresponds to price element 526 of webpage 520, which indicates that the price of the "Men's Full-Zip Polar Fleece Jacket" is $29.20. It should be noted that there may be other elements of webpage 520 that depict price information, such as price element 530. However, price element 526 is determined to be associated with the product of product listing portion 525, and thus panel control 516 is arranged as a sub-level to panel control 515. (Price element 526 may be determined to be associated with product listing portion 525 by site feature extractor 260, which may determine that price element 526 is related to product listing portion 525 because price element 526 is located within the product listing portion 525 of webpage 520.) Panel control 516 can be actuated for accessing (or performing an operation associated with) price element 526, such as causing the focus of webpage 520 to be set on the price element 526.

Figure 5G:
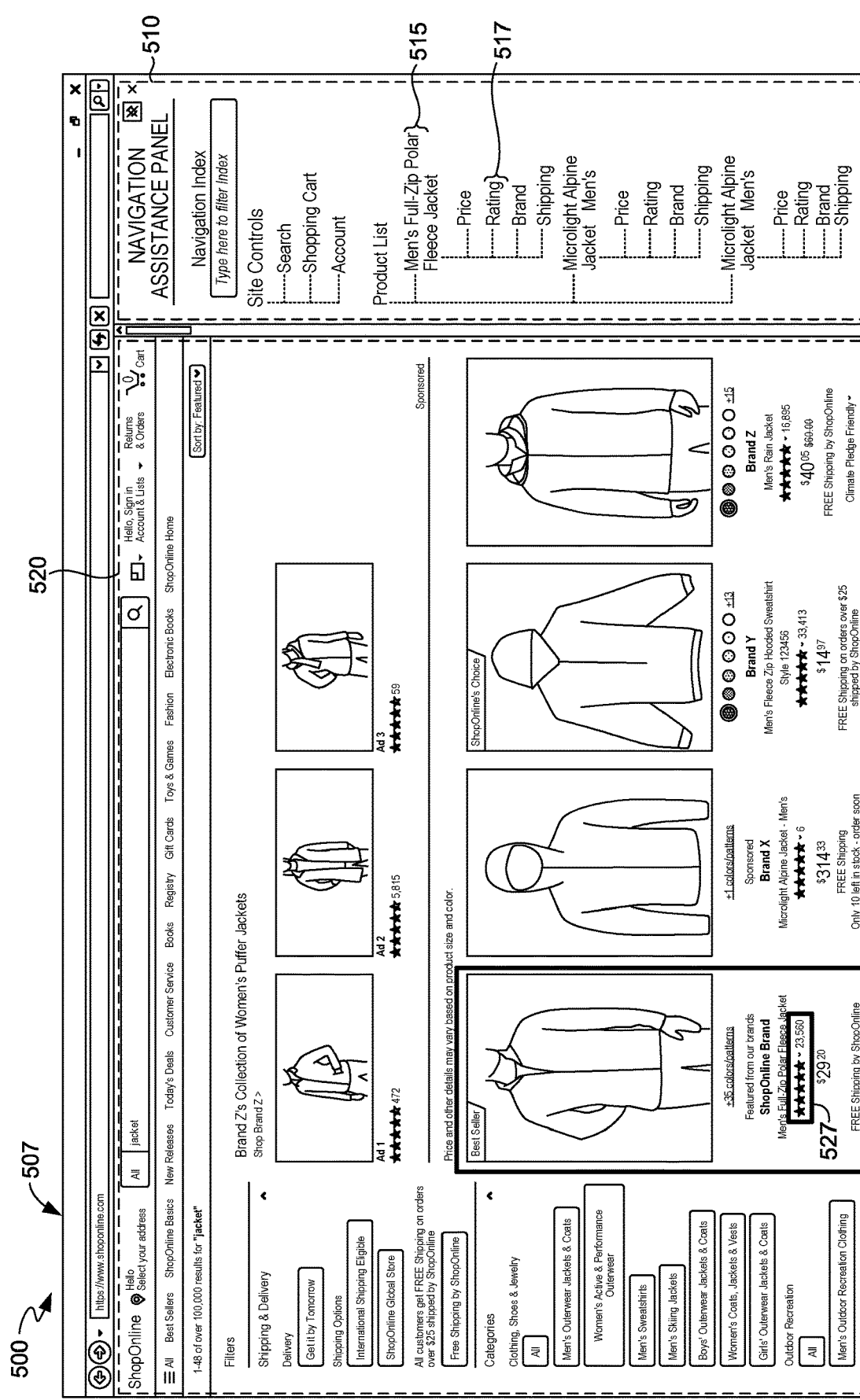

Turning to FIG. 5G, screenshot 507 depicts a panel control 517 that is a control for an element of webpage 520 that shows product ratings information for a particular product identified in product listing portion 525. Similar to panel control 516 of FIG. 5F, the hierarchical arrangement of panel control 517 indicates that this ratings information is associated with the product corresponding to panel control 515, which is the "Men's Full-Zip Polar Fleece Jacket" identified in product listing portion 525. Panel control 517 thus corresponds to ratings element 527 of webpage 520, which indicates a customer rating for the "Men's Full-Zip Polar Fleece Jacket" depicted in product listing portion 525. Similar to price element 526 of FIG. 5F, ratings element 527 is determined to be associated with the product of product listing portion 525, and thus panel control 517 is arranged as a sub-level to panel control 515. (Ratings element 527 may be determined to be associated with product listing portion 525 by site feature extractor 260, in a manner similar to price element 526 of FIG. 5F, described previously.) Panel control 517 can be actuated for accessing (or performing an operation associated with) ratings element 527, such as causing the focus of webpage 520 to be set on the ratings element 527.

Figure 5H:
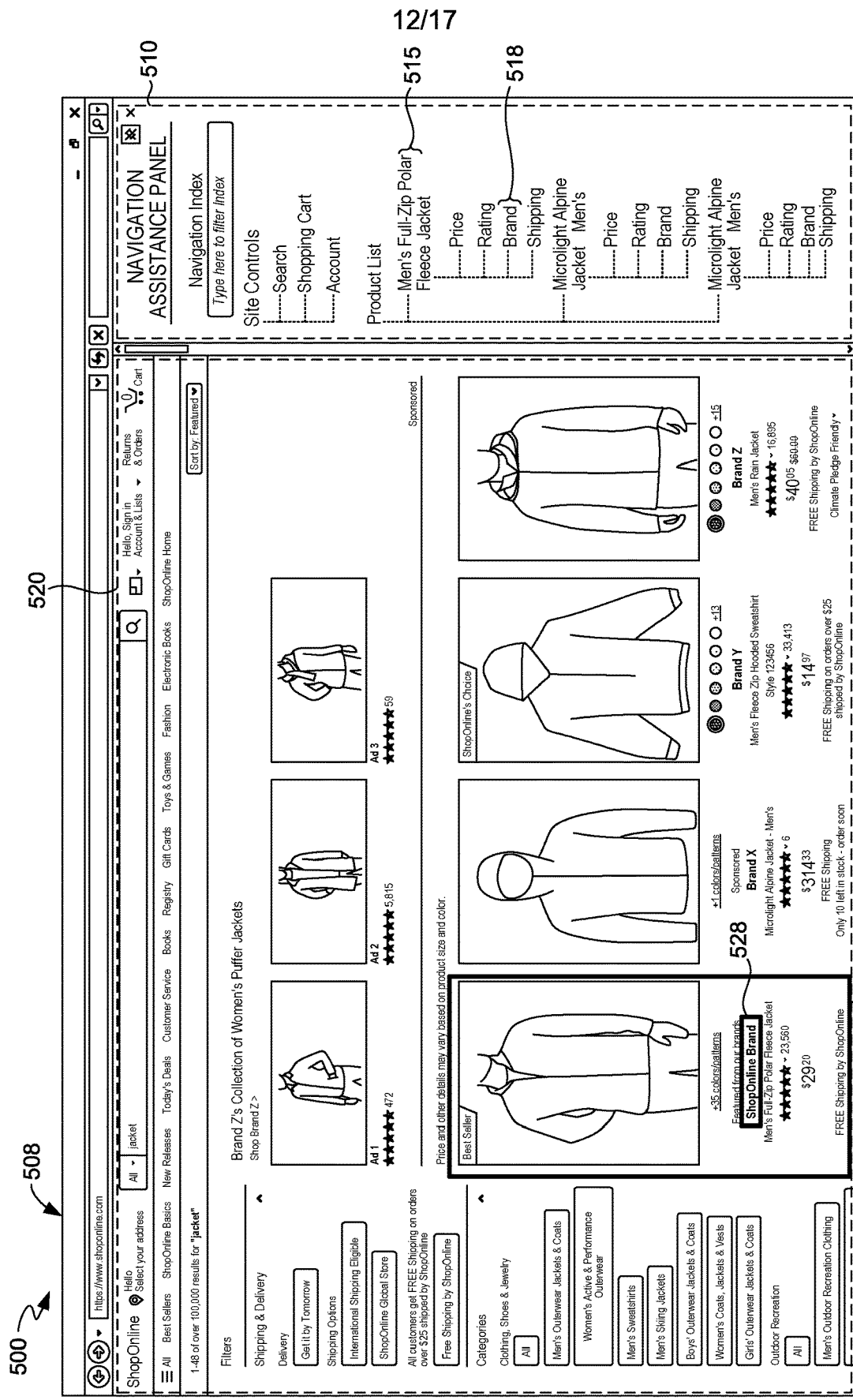

Turning to FIG. 5H, screenshot 508 depicts a panel control 518 that is a control for an element of webpage 520 that shows brand information for a particular product identified in product listing portion 525. Similar to panel control 516 of FIG. 5F, the hierarchical arrangement of panel control 518 indicates that this brand information is associated with the product corresponding to panel control 515, which is the "Men's Full-Zip Polar Fleece Jacket" identified in product listing portion 525. Panel control 518 thus corresponds to brand element 528 of webpage 520, which indicates the brand of the "Men's Full-Zip Polar Fleece Jacket" depicted in product listing portion 525. Similar to price element 526 of FIG. 5F, brand element 528 is determined to be associated with the product of product listing portion 525, and thus panel control 518 is arranged as a sub-level to panel control 515. (Brand element 528 may be determined to be associated with product listing portion 525 by site feature extractor 260, in a manner similar to price element 526 of FIG. 5F, described previously.) Panel control 518 can be actuated for accessing (or performing an operation associated with) brand element 528, such as causing the focus of webpage 520 to be set on the ratings element 528.

Figure 5I:
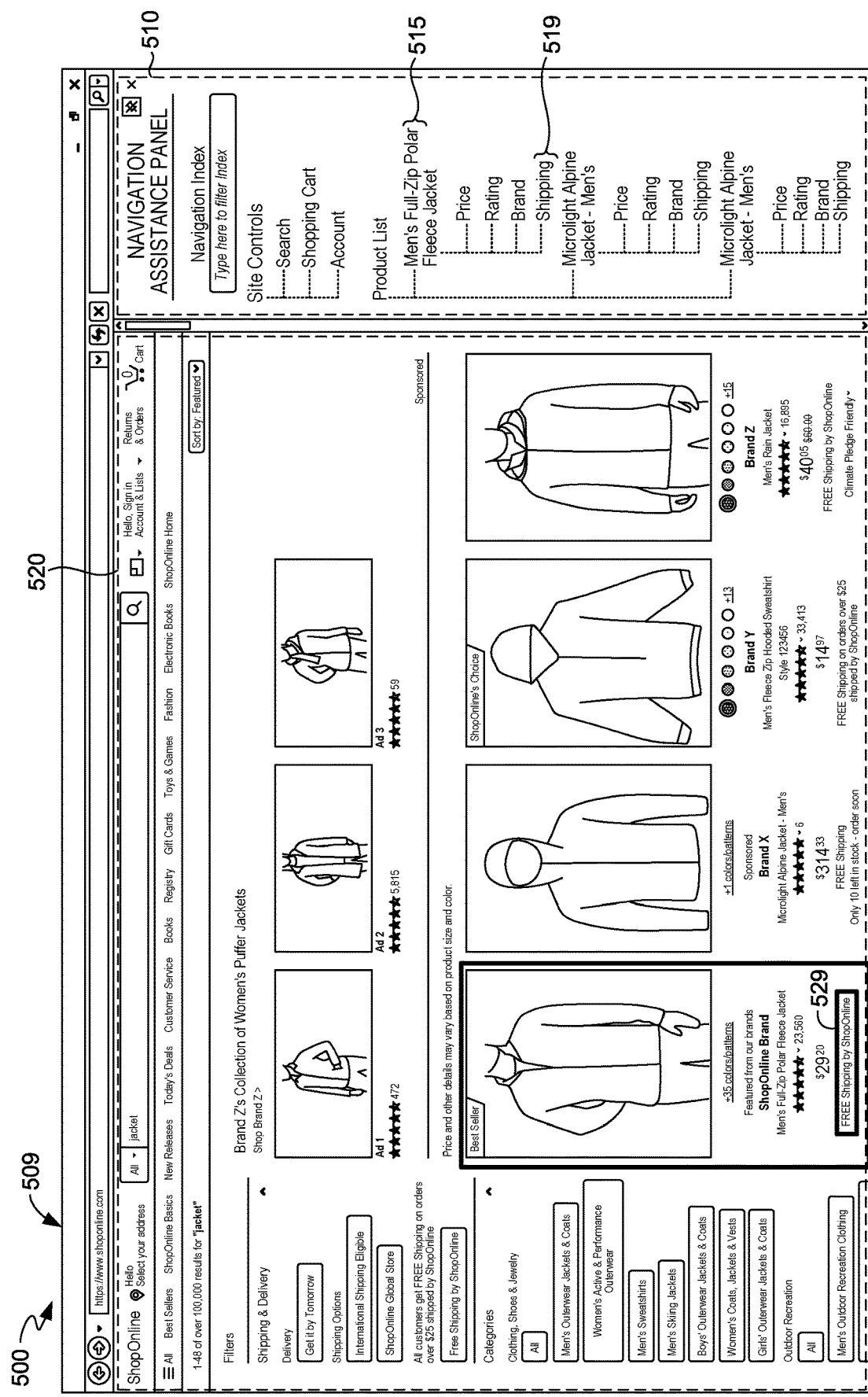

Turning to FIG. 5I, screenshot 509 depicts a panel control 519 that is a control for an element of webpage 520 that shows shipping information for a particular product identified in product listing portion 525. Similar to panel control 516 of FIG. 5F, the hierarchical arrangement of panel control 519 indicates that this shipping information is associated with the product corresponding to panel control 515, which is the "Men's Full-Zip Polar Fleece Jacket" identified in product listing portion 525. Panel control 519 thus corresponds to shipping element 529 of webpage 520, which indicates shipping information for the "Men's Full-Zip Polar Fleece Jacket" depicted in product listing portion 525. Similar to price element 526 of FIG. 5F, shipping element 529 is determined to be associated with the product of product listing portion 525, and thus panel control 519 is arranged as a sub-level to panel control 515. (Shipping element 529 may be determined to be associated with product listing portion 525 by site feature extractor 260, in a manner similar to price element 526 of FIG. 5F, described previously.) Panel control 519 can be actuated for accessing (or performing an operation associated with) shipping element 529, such as causing the focus of webpage 520 to be set on the shipping element 529.

Turning now to FIGS. 6 and 7, aspects of an example process flows 600 and 700 are illustratively depicted for some embodiments of the disclosure. Process flows 600 and 700 each may comprise a method (sometimes referred to herein as method 600 and method 700) that may be carried out to implement various example embodiments described herein. For instance, process flow 600 or process flow 700 may be performed to programmatically determine or generate an assistance user interface to facilitate access to a computer resource, which may be used to provide any of the improved computer technologies or enhanced user computing experiences described herein.

Each block or step of process flow 600, process flow 700, and other methods described herein comprises a computing process that may be performed using any combination of hardware, firmware, and/or software. For instance, various functions may be carried out by a processor executing instructions stored in memory, such as memory 812 described in FIG. 8 and/or storage 225 described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. The blocks of process flow 600 and 700 that correspond to actions (or steps) to be performed (as opposed to information to be processed or acted on) may be carried out by one or more computer applications or services, in some embodiments, which may operate on one or more user devices (such as user device 102a of FIG. 1), servers (such as server 106 of FIG. 1), and may be distributed across multiple user devices, and/or servers, or by a distributed computing platform, and/or may be implemented in the cloud, such as described in connection with FIG. 9. In some embodiments, the functions performed by the blocks or steps of process flows 600 and 700 are carried out by components of system 200, described in connection to FIG. 2.

With reference to FIG. 6, aspects of example process flow 600 are illustratively depicted for providing an assistance UI to facilitate access to a computer resource. In particular, example process flow 600 may be performed to generate an assistance UI, which may comprise one or more UI controls that each correspond to a feature or element of the computer resource, such that a UI control may be utilized by a user for accessing the corresponding feature or element of the computer resource, as described in connection with FIGS. 2, 3, 4, and 5A-5I.

At a block 610, method 600 includes, based on at least one feature of a computer resource having a plurality of features, classifying the computer resource according to a category. Embodiments of block 610 perform operations to classify a computer resource as a category or type of resource based on at least one data feature of the computer resource. For example, where the computer resource is a webpage, the webpage may be classified according to a category, such as one of a banking website, education website, shopping product listing website, shopping product description website, payment website, or other types of categories such as described herein. Some embodiments of block 610 may further classify the computer resource according to a subcategory, such as a product listing webpage (subcategory) of a shopping webpage (category).

Some embodiments of block 610 programmatically classify the computer resource by utilizing a classification model, such as described in connection with site classifier 250 of FIG. 2. The at least one feature of the computer resource used to perform the classification may include, without limitation, one or more elements or other data features of the computer resource, such as a URL of the computer resource, a domain name, a portion of text in the computer resource, an image in the computer resource, data in the computer resource or metadata associated with the computer resource, or a combination of these. In some embodiments, the computer resource (or a portion thereof) is received or accessed and then classified. For example, the computer resource may comprise a webpage that is received via an http request communicated via a web browser application. Some embodiments of block 610 may be carried out using site classifier 250 (FIG. 2) and, in some embodiments, also using data receiver component 210 (FIG. 2). Additional details of embodiments of block 610, or for carrying out operations of block 610, are described in connection to FIG. 2, and in particular site classifier 250.

At a block 620, method 600 includes determining a set of features to detect in the computer resource. Embodiments of block 620 determine a set of data features to be searched for in the computer resource of block 610. In particular, based on the category of the computer resource determined at block 610, a set of data features are determined. The set of data features may be associated with the particular category of computer resource. For example, in some embodiments, each category of computer resource has a corresponding set of features comprising entities or other data features that are typically present in computer resources belonging to that category. For instance, where the computer resource is a shopping website, a particular data feature in the set of features typically present on shopping websites is a shopping cart element (or basket, or bag).

The set of data features determined at block 620 may be used to determine features to be searched for in the computer resource as described at block 630. In particular, in some embodiments, each of the features determined in the set of features at block 620 is used programmatically to process the computer resource to determine if the feature is present. In some implementations, each or some of the features in the set determined at block 620 has corresponding feature extraction logic for detecting presence of the feature in the computer resource. For instance, in an embodiment, one or more entity extraction models are used to process the computer resource to detect (and in some embodiments extract) a particular feature. Some embodiments of block 620 may be carried out using site feature extractor 260 (FIG. 2). Additional details of embodiments of block 620, or for carrying out operations of block 620, are described in connection to FIG. 2, and in particular site feature extractor 260.

At a block 630, method 600 includes determining that the computer resource includes at least a portion of the set of features, thereby determining a subset of features in the computer resource. Embodiments of block 630 determine those features, in the set of features determined at block 620, which are present in the computer resource. In particular, embodiments of block 630 programmatically determine that the computer resource includes at least a portion or subset of the features (in the set of features determined at block 620) by detecting those features in the set of features that are present in the computer resource. As the set of features determined at block 620 comprises features associated with the category of computer resource, such as those features typically present in computer resources of that category, it is possible that not all features in the set are present on the specific computer resource described at block 610. Thus, some embodiments of block 630 determine which features, in the set of features of block 620, are present in the computer resource described at block 610. Accordingly, the subset of features determined at block 630 comprises those features of the set of features that are detected in the computer resource.

Some embodiments of block 630 utilize a computer application or service to parse and analyze data of the computer resource to identify, extract, or otherwise determine the data features. Some embodiments of block 630 utilize feature extraction logic, such as feature extraction logic 235 described in connection with FIG. 2, to determine, detect data feature types, and/or extract data features from of the computer resource. In some embodiments, feature extraction logic is used for each feature in the set of features to detect whether that feature is present in the computer resource. For example, in an embodiment, an entity extraction model may be utilized for detecting and/or extracting a particular feature, such as further described in connection with feature extraction logic 235 of FIG. 2. Moreover, in some embodiments, the subset of features determined at block 630 are extracted and stored in a data structure, such as a JSON data structure or other hierarchical data structure. The data structure may be used at block 640 for generating an assistance UI.

Some embodiments of block 630 utilize an XML document that represents aspects of the computer resource, such as a DOM where the computer resource is a webpage. In some of these embodiments, the XML document is searched or otherwise processed to detect those features in the set of features that are present in the XML document. Further, some embodiments comprise determining the location of a feature indicated in the XML document to generate a feature location index of features in the subset of features. The feature location index may be utilized in some embodiments of block 640 to generate an assistance UI. Some embodiments further comprise modifying the XML document to include an indication of each feature of the subset at a location in the XML document corresponding to the location of the feature in the computer resource, and thereby generating a modified XML document. The modified XML document may be used in some embodiments of block 640 to generate an assistance UI. Some embodiments of block 630 may be carried out using site feature extractor 260 (FIG. 2) and in some instances also using feature data-structure generator 270 (FIG. 2). Additional details of embodiments of block 630, or for carrying out operations of block 630, are described in connection to FIG. 2, and, in particular, site feature extractor 260 and feature data-structure generator 270.

At a block 640, method 600 includes generating a supplemental UI comprising at least a first control corresponding to a first feature in the subset of features, and configured to perform an operation associated with the first feature, subsequent to actuation of the first control. Block 640 generates an embodiment of an assistance UI, such as the assistance UI panel described in connection with FIG. 4, or another embodiment of an assistance UI as described herein. The UI generated at block 640 may be considered supplemental to a user interface provided via a computer browser or viewer application presenting the computer resource (or a portion thereof). For instance, as described herein, a user may access directly and navigate the computer resource (e.g., via a browser) or may access the computer resource with the assistance of the assistance UI. Some embodiments of block 640 further generate the UI based on the category (or in some embodiments the subcategory) of computer resource determined at block 610. Further, some embodiments of block 640 utilize UI template or UI logic for generating the UI, such as described in connection with UI template library 246 of FIG. 2. Some embodiments of block 640 generate a UI comprising a plurality of controls, each of which may correspond to a feature in the subset and each of which may be configured according to the various embodiments described in connection with the first control or a panel control described in connection with FIGS. 2 and 4.

The UI generated at block 640 comprises at least a first control, such as a panel control described herein. The first control corresponds to a first feature in the computer resource, because the subset of features (determined at block 630) comprise features present in the computer resource. For example, as shown in FIG. 4, a UI generated at block 640 may comprise assistance UI panel 410 that includes a first control (e.g., a panel control), such as panel control 412 for a shopping cart. The first control (e.g., panel control 412) corresponds to a first feature in the subset of features of the computer resource (e.g., panel control 412 corresponds to element 422 for the "cart" control element, which is a feature of the computer resource that is webpage 420). Moreover, in some instances, the first control comprises a control name that may be determined based on a feature type of the first feature. For example, panel control 412 has the control name "shopping cart" which is determined based on the corresponding "cart" control element 422, as described in connection with panel generator 282 of FIG. 2.

According to method 600 at block 640, the first control is configured to perform an operation associated with the first feature, subsequent to being actuated. For instance, upon detecting actuation of the first control (such as by the clicking or touching of the first control in the assistance UI by a user), an operation associated with the first feature is performed. In various embodiments of block 640, the operation can comprise setting the focus on the first feature; navigating to another computer resource based on a location specified by the first feature, such as a hyperlink included in the first feature; actuating a control element at the first feature; or issuing an API call. In some instances, the API call may include a call parameter indicating the identity or location of the first feature in the computer resource. In some embodiments, the first feature may comprise a control element such as a hyperlink, button, slider, text field, or search query input field, as described herein. Accordingly, some embodiments of block 640 comprise actuating the control element of the first feature in response to or subsequent to actuating the first control. For example, where the first feature comprises a control element that is a button, the button may be actuated in response to a user actuating the first control, which corresponds to the first feature, in some embodiments. In some embodiments of block 640, the first control is configured to generate or issue a command upon actuation, such as described herein. For example, the command may comprise setting a focus on the first feature. Some embodiments of block 640 may be carried out using assistance UI controller 280 (FIG. 2). Additional details of embodiments of block 640, or for carrying out operations of block 640, are described in connection to FIG. 2, and in particular assistance UI controller 280.

At a block 650, method 600 includes presenting the supplemental UI on a first computing device. Embodiments of block 650 present the supplemental UI generated in block 640 on a computer device (or cause the supplemental UI to be presented on a computer device) in a manner that does not conceal or inhibit access to the computer resource. For example, the supplemental UI is presented in a manner that does not obscure or replace portions of the computer resource that would otherwise be accessible to the user, such as described previously. Some embodiments of block 650 present the UI as a sidebar or a popup application window of a web browser computer application or computer viewer application that is also presenting the computer resource. Alternatively, the UI may be presented in a separate application window on the computer device or may be presented on a separate user device. For instance, as described in connection with assistance UI controller 280, one embodiment presents the supplemental UI on a separate user device, such as a smart phone or smart remote control.

Some embodiments of block 650 may be carried out using presentation component 220 (FIG. 2) and in some instances, using assistance UI controller 280 (FIG. 2). Additional details of embodiments of block 650, or for carrying out operations of block 650, are described in connection to FIG. 2, and, in particular, presentation component 220 and assistance UI controller 280. Moreover, several examples of supplemental UIs generated and presented according to some embodiments of method 600 are illustratively depicted in FIGS. 4 and 5A-5I, and are described further in connection with these drawings.

With reference to FIG. 7, aspects of example process flow 700 are illustratively depicted for providing an assistance UI to facilitate access to a computer resource. In particular, example process flow 700 may be performed to generate an assistance UI, which may comprise one or more UI controls that each correspond to a feature or element of the computer resource, such that a UI control may be utilized by a user for accessing the corresponding feature or element of the computer resource, as described in connection with FIGS. 2, 3, 4, and 5A-5I.

At a block 710, method 700 includes receiving a computer resource that includes one or more features. For example, the computer resource may be received from a data source, such as data source 104n (FIG. 1), and, in an embodiment, comprises a webpage that is received via an http request communicated via a web browser application. In some embodiments, the computer resource is received at or accessed via a computer viewer application on a user computing device, such as a laptop computer, mobile device, smart television, or smart speaker. The one or more features of the computer resource may comprise elements of the computer resource including entities, site components or elements of computer resource content, and metadata associated with the computer resource. Some embodiments of block 710 may be carried out using data receiver component 210 (FIG. 2). Additional details of embodiments of block 710, or for carrying out operations of block 710, are described in connection to FIG. 2, and, in particular, data receiver component 210.

At a block 720, method 700 includes determining a category of the computer resource. Embodiments of block 720 may programmatically determine a category of the computer resource received at block 710 based on a first set of the one or more features of the computer resource. In particular, at least a portion (comprising the first set) of the one or more features included in the computer resource received at block 710 are used at block 720 to determine a category of the computer resource. In some embodiments, the first set of features comprises, without limitation, one or more elements or other data features of the computer resource, such as a URL of the computer resource, a domain name, a portion of text in the computer resource, an image in the computer resource, data in the computer resource or metadata associated with the computer resource, or a combination of these. In some embodiments, a subcategory of the computer resource also is determined at block 720.

Some embodiments of block 720 determine a category of the computer resource by classifying the computer resource according to a category, based on the first set of features. For example, where the computer resource is a webpage, the webpage may be classified according to a category, such as one of a banking website, education website, shopping product listing website, shopping product description website, payment website, or other types of categories or subcategories such as described herein. Some embodiments of block 720 programmatically classify the computer resource by utilizing a classification model, such as described in connection with site classifier 250 of FIG. 2.

Some embodiments of block 720 may be implemented as an embodiment of block 610 (process flow 600). The operations of block 720 may be carried out using an embodiment of site classifier 250 (FIG. 2). Additional details of embodiments of block 610, or for carrying out operations of block 610, are described in connection to FIG. 2, and, in particular, site classifier 250.

At block 730, method 700 includes determining a set of UI controls for an assistance UI panel, each UI control corresponding to a feature of the computer resource. Embodiments of block 730 determine one or more UI controls to be included as components of an assistance UI panel, such as panel controls 411 and 412 of assistance UI panel 410, described in connection with FIG. 4. Each UI control determined at block 730 corresponds to at least one feature of the computer resource. For example, panel controls 411 and 412 of assistance UI panel 410 correspond to search bar element 421 and cart element 422, respectively, which are each features of a computer resource. (Here, the computer resource is webpage 420.) In some embodiments, one or more of the UI controls determined at block 730 comprise a control name. The control name also may be determined at block 730 based on a feature type of the corresponding feature. For example, panel control 412 has control name "shopping cart" which is determined based on the corresponding "cart" control element 422, as described in connection with panel generator 282 of FIG. 2.

Embodiments of block 730 may determine the set of UI controls based, at least in part, on the category of computer resource determined at block 710. In particular, some embodiments of block 730 utilize UI template or UI logic to determine the UI controls, such as described in connection with UI template library 246 of FIG. 2. In some embodiments, each UI control determined at block 730 is configured to perform an operation associated with the feature of the computer resource corresponding to the UI control, subsequent to being actuated. For instance, upon detecting actuation of a particular UI control (such as by a user's clicking or touching of the UI control in the assistance UI panel), an operation, associated with the feature of the computer resource corresponding to the actuated UI control, is performed. In various embodiments of block 730, the operation can comprise setting the focus on the corresponding feature; navigating to another computer resource based on a location specified by the corresponding feature, such as a hyperlink included in the corresponding feature; actuating a control element at the corresponding feature; or issuing an API call. In some instances, the API call may include a call parameter indicating the identity or location of the corresponding feature in the computer resource. In some embodiments, the corresponding feature may comprise a control element such as a hyperlink, button, slider, text field, or search query input field, as described herein. Accordingly, some embodiments of block 730 comprise actuating the control element of the corresponding feature in response to or subsequent to actuating the UI control that corresponds to the feature. For example, where a feature corresponding to a UI control comprises a control element that is a button, the button may be actuated in response to a user actuating the corresponding UI control, in some embodiments. In some embodiments, a UI control determined at block 730 is configured to generate or issue a command upon actuation, such as described herein. For example, the command may comprise setting a focus on the first feature.

Embodiments of block 730 determine the set of UI controls based on a second set of features of the computer resource. Some embodiments of block 730 include performing operations to programmatically determine the second set of features by detecting particular features that are present in the computer resource. In particular, according to some embodiments of block 730, a plurality of computer-resource feature types to be detected in a computer resource is determined based on the category of the computer resource, and in some instances, based on the subcategory. The plurality of feature types may comprise indications of data features that are typically present in computer resources of that category. For example, where the computer resource category is a shopping webpage, a feature type may comprise a shopping-cart type feature, which may be present in an actual shopping webpage as a cart feature, shopping cart feature, bag feature, basket feature, or the like. Each feature-type of the plurality may be used to programmatically search the computer resource for features of that type. The features detected in the computer resource comprise a second set of features.

Some embodiments of block 730 utilize feature extraction logic, such as feature extraction logic 235 described in connection with FIG. 2, to determine a plurality of feature types corresponding to the category (or subcategory) of a computer resource. Feature extraction logic also may be used to programmatically search the computer resource for features of each of the feature types. For example, in some embodiments of entity extraction logic utilized at block 730, a particular feature type has a corresponding detection logic (such as instructions for detecting the feature) or extraction logic, such as an entity extraction model, as described herein. In some implementations, the second set of features determined at block 730 are extracted and stored in a data structure, such as a JSON data structure or other hierarchical data structure. The data structure may be used at block 740 for generating the assistance UI panel.

Some embodiments of block 730 utilize an XML document that represents aspects of the computer resource, such as a DOM where the computer resource is a webpage. In some of these embodiments, the XML document is searched or otherwise processed to determine the second set of features by detecting features present in the XML document. Again as described herein, in some embodiments, a feature extraction logic may be utilized to programmatically search the XML document for features of the feature types indicated by the feature extraction logic. Some embodiments of block 730 further comprise determining the location of a feature indicated in the XML document to generate a feature location index of the features in the second set of features.

The feature location index also may be utilized in some embodiments of block 730 to determine a UI control to be configured to perform an operation on the feature of the computer resource corresponding to the UI control, subsequent to the UI control being actuated, by providing location information of the corresponding feature. For example, where the operation performed comprises an API call, the location information of the feature corresponding to the UI control may be provided as an API call parameter. The feature location index also may be utilized in some embodiments of block 740 to generate an assistance UI panel. Some embodiments of block 730 further comprise modifying the XML document to include an indication of each feature, of the second set of features, at a location in the XML document corresponding to the location of the feature in the computer resource, and thereby generating a modified XML document. The modified XML document may be used in some embodiments of block 730 to configure a UI control or at block 740 to generate an assistance UI.

Some embodiments of block 730 may be carried out using assistance UI controller 280, and, in particular, panel generator 282 (FIG. 2) and, in some instances, using site feature extractor 260 (FIG. 2). Some embodiments of block 730 may be further carried out using feature data-structure generator 270 (FIG. 2). Additional details of embodiments of block 730, or for carrying out operations of block 730, are described in connection to FIG. 2, and, in particular, panel generator 282, site feature extractor 260 and feature data-structure generator 270.

At a block 740, method 700 includes generating the assistance UI panel that includes the set of UI controls determined at block 730. Block 740 generates an embodiment of an assistance UI panel, such as the assistance UI panel described in connection with FIGS. 4 and 5A-5I, or another embodiment of an assistance UI panel as described herein. Some embodiments of block 740 further generate the assistance UI panel based on the category (or in some embodiments the subcategory) of the computer resource determined at block 720. Further, some embodiments of block 740 utilize UI template or UI logic for generating the assistance UI panel, such as described in connection with UI template library 246 of FIG. 2. Some embodiments of block 740 may be implemented as an embodiment of block 640 (process flow 600). The operations of block 740 may be performed using an embodiment of assistance UI controller 280 (FIG. 2). Additional details of embodiments of block 740, or for carrying out operations of block 740, are described in connection to FIG. 2, and, in particular, assistance UI controller 280.

At a block 750, method 700 includes presenting the assistance UI panel with a presentation of the computer resource and without altering the presentation of the computer resource. Embodiments of block 750 present the assistance UI panel generated at block 740 with a presentation of the computer resource received at block 710. The assistance UI panel is presented in a manner that does not alter or conceal the presentation of the computer resource. For example, in some embodiments of block 750, the assistance UI panel is presented as a supplemental UI, which may be located proximate to a presentation of the computer resource, rather than on top of or in place of the computer resource (or a portion thereof), or may be presented in a manner that does not obscure or replace portions of the computer resource that would otherwise be accessible to the user, such as described previously. In these embodiments, the assistance UI panel may be considered supplemental to a user interface provided via a computer browser or viewer application presenting the computer resource (or a portion thereof). For instance, as described herein, a user may access directly and navigate the computer resource (e.g., via a browser) or may access the computer resource with the assistance of the assistance UI.

Some embodiments of block 750 present the assistance UI panel as a sidebar or a popup application window of a web browser computer application or computer viewer application that is also presenting the computer resource. Alternatively, the UI may be presented in a separate application window on the computer device or may be presented on a separate user device. For instance, as described in connection with assistance UI controller 280, the assistance UI panel may be presented on a separate user device, such as a smart phone or smart remote control.

Some embodiments of block 750 may be implemented as an embodiment of block 650 (process flow 600). The operations of block 750 may be carried out using an embodiment of presentation component 220 (FIG. 2) and, in some instances, also using assistance UI controller 280 (FIG. 2). Additional details of embodiments of block 750, or for carrying out operations of block 750, are described in connection to FIG. 2, and, in particular, presentation component 220 and assistance UI controller 280. Moreover, several examples of assistance UI panels, which may be generated and presented according to some embodiments of method 700 are illustratively depicted in FIGS. 4 and 5A-5I, and are described further in connection with those drawings.

Accordingly, we have described various aspects of improved computer-user interface technologies. It is understood that various features, sub-combinations, and modifications of the embodiments described herein are of utility and may be employed in other embodiments without reference to other features or sub-combinations. Moreover, the order and sequences of steps shown in the example methods 600 and 700 are not meant to limit the scope of the present disclosure in any way, and, in fact, the steps may occur in a variety of different sequences within embodiments hereof. Such variations and combinations thereof are also contemplated to be within the scope of embodiments of this disclosure.

Other Embodiments

In some embodiments, a computerized system to provide an assistance user interface (UI) to facilitate access to a computer resource is provided, such as the computerized system described in any of the embodiments above. The computerized system comprises at least one processor, and computer memory having computer-readable instructions embodied thereon, that, when executed by the at least one processor, perform operations. The operations comprise receive at least a portion of a first computer resource having a plurality of features, and based on at least one feature of the first computer resource, programmatically classify the first computer resource according to a category. The operations further comprise based on the category, determine a set of features to detect in the first computer resource. The operations further comprise programmatically determine that the first computer resource includes at least a subset of the features. The operations further comprise based on at least the subset of features, generate a supplemental user interface (UI) comprising at least a first control, the first control configured to correspond to a first feature of the subset of features and further configured to cause to be performed, upon actuation of the first control, an operation associated with the first feature of the subset of features. The operations further comprise cause the UI to be presented on a first computing device such that the UI does not conceal access to the first computer resource.

Advantageously, these and other embodiments, as described herein improve existing computing technologies by providing new or improved functionality in computing applications including computer-user interface technology to facilitate access to a computer resource. In particular, these and other embodiments described herein improve computing applications for viewing or accessing a computer resource by providing new functionality, technologically enable computer users, who may have accessibility needs, to access or navigate a computer resource, and provide an improve user computing experience. Computer technology is also improved by providing new functionality that enables a computer to perform operations, which may be at the request of a user, that otherwise are inaccessible or inoperable while using conventional assistive technologies on the computer. For example, the functionality provided by these embodiments can provide improved access to a computer resource such as a website, such as providing an alternative means of accessing content on the computer resource using an assistance UI.

Further, these embodiments improve computing technology by providing a new control mechanism of the computer system that enables a user to access aspects of a computer resource that are inaccessible by conventional assistive technologies. In this way, these embodiments improve the utilization of computing resources by enabling more efficient control of computing operations by a user. Further still, these embodiments improve computing technology by providing a new, supplemental computer-user interface for accessing a computer resource, such as a website, that does not conceal or override content of computer resource. In this way, these embodiments enable an improved user experience across a number of computer devices, applications, and platforms. Moreover, particular embodiments of the assistance UI do not hide, override, or otherwise limit access to content of an existing computer resource, such as a website, but instead provide a supplemental control and consistent structure of the site content, thereby improving access and control to users with accessibility needs, as well as improving the performance of other assistive technology.

Further still, these embodiments improve computing technology by providing a computer-user interface for facilitating accessing a computer resource that is not dependent on the design or language(s) used to author the computer resource. In this way, some of these embodiments of the assistance UI provided herein for accessing a computer resource that is a website are website agnostic, with regards to the language(s) used to author a website, and do not require a website to be designed for accessibility. Nor do these embodiments require the website author to modify the website to be compatible with the assistance UI.

Further still, some of these embodiments improve computing technology by modifying the operation of other assistive technologies to improve their operation, and in so doing, also conserve utilization of resources such as bandwidth and power consumption. For example, these resources are conserved by causing the assistive technologies to perform with greater computational efficiency, such as by reducing their unnecessary utilization and directing their operation to aspects of the computer resource that the user is interested in navigating.

In any combination of the above embodiments of the system, the operations further comprise detecting that the first control is actuated, and responsive to the detection, causing the operation associated with the first feature to be performed.

In any combination of the above embodiments of the system, the operation associated with the first feature comprises one of: setting a focus on the first feature, navigating to a second computer resource based on a location specified by the first feature, actuating a control element at the first feature, and issuing an API call that includes an parameter indicating the location of the first feature in the first computer resource.

In any combination of the above embodiments of the system, the first computer resource comprises a webpage, and wherein causing the UI to be presented comprises presenting the UI as a sidebar or a popup application window of a web browser computer application that is also presenting at least the portion of the first computer resource, the web browser computer application operating on the first computing device.

In any combination of the above embodiments of the system, the first feature includes a control element comprising one of a hyperlink, button, slider, text field, or search query input field; and wherein the control element can be actuated by a user interacting directly with the control element via the computer resource or by the user actuating the first control of the UI.

In any combination of the above embodiments of the system, the first control comprises a first control name that is determined based on a feature type of the first feature.

In any combination of the above embodiments of the system the UI is generated according to a UI template that is determined based on at least the category of the first computer resource.

In any combination of the above embodiments of the system, the operations further comprise programmatically classifying the first computer resource according to a category comprises utilizing a classification model; wherein the at least one feature of the first computer resource for which the programmatic classification is based comprises a URL, a domain name, a text, or an image; and wherein programmatically determining that the first computer resource includes at least the subset of the features comprises utilizing an entity extraction model that is determined from training an entity recognition model to detect at least one feature of the subset of the features.

In any combination of the above embodiments, aspects of the first computer resource are represented by an Extensible Markup Language (XML) document, and the operations further comprise determining a location in the XML document for each feature of the subset of the features, thereby generating a feature location index from the XML document; and utilizing the feature location index to generate the UI comprising at least the first control.

In any combination of the above embodiments of the system, aspects of the first computer resource are represented by a Document Object Model (DOM), and the operations further comprise generating or modifying the DOM to include an indication of each feature of the subset of the features at a location in the DOM corresponding to the location of that feature in the computer resource; and utilizing the generated or modified DOM to generate the UI comprising at least the first control.

In any combination of the above embodiments of the system, the operation for causing the UI to be presented such that the UI does not conceal access to the first computer resource comprises: causing the UI to be presented proximate to a presentation of the at least the portion of the first computer resource; or causing the UI to be presented on the first computing device that is different than a second computing device on which the at least the portion of the first computer resource is presented.

In any combination of the above embodiments of the system, the first computer resource comprises a webpage, and the category comprises one of: banking, education, shopping product listing, shopping product description, shopping payment, government services, utility payment, consumer services payment, social media, news, entertainment, or travel planning.

In some embodiments, a computer-implemented method is provided to provide an assistance user interface (UI) to facilitate access to a computer resource. The method comprises receiving the computer resource that comprises one or more features and programmatically determining a category of the computer resource based on a first set of the one or more features of the computer resource. The method further comprises determining, based on a second set of the one or more features of the computer resource, a set of UI controls for an assistance UI panel, each UI control in the set of UI controls corresponding to a feature in the second set of features. The method further comprises generating the assistance UI panel that includes the set of UI controls. The method further comprises presenting the assistance UI panel with a presentation of the computer resource without altering the presentation of the computer resource. Advantageously, these and other embodiments, as described herein improve existing computing technologies by providing new or improved functionality in computing applications including computer-user interface technology to facilitate access to a computer resource. In particular, these and other embodiments described herein improve computing applications for viewing or accessing a computer resource by providing new functionality, technologically enable computer users, who may have accessibility needs, to access or navigate a computer resource, and provide an improve user computing experience. Computer technology is also improved by providing new functionality that enables a computer to perform operations, which may be at the request of a user, that otherwise are inaccessible or inoperable while using conventional assistive technologies on the computer. For example, the functionality provided by these embodiments can provide improved access to a computer resource such as a website, such as providing an alternative means of accessing content on the computer resource using an assistance UI.

Further, these embodiments improve computing technology by providing a new control mechanism of the computer system that enables a user to access aspects of a computer resource that are inaccessible by conventional assistive technologies. In this way, these embodiments improve the utilization of computing resources by enabling more efficient control of computing operations by a user. Further still, these embodiments improve computing technology by providing a new, supplemental computer-user interface for accessing a computer resource, such as a website, that does not conceal or override content of computer resource. In this way, these embodiments enable an improved user experience across a number of computer devices, applications, and platforms. Moreover, particular embodiments of the assistance UI do not hide, override, or otherwise limit access to content of an existing computer resource, such as a website, but instead provide a supplemental control and consistent structure of the site content, thereby improving access and control to users with accessibility needs, as well as improving the performance of other assistive technology.

Further still, these embodiments improve computing technology by providing a computer-user interface for facilitating accessing a computer resource that is not dependent on the design or language(s) used to author the computer resource. In this way, some of these embodiments of the assistance UI provided herein for accessing a computer resource that is a website are website agnostic, with regards to the language(s) used to author a website, and do not require a website to be designed for accessibility. Nor do these embodiments require the website author to modify the website to be compatible with the assistance UI.

Further still, some of these embodiments improve computing technology by modifying the operation of other assistive technologies to improve their operation, and in so doing, also conserve utilization of resources such as bandwidth and power consumption. For example, these resources are conserved by causing the assistive technologies to perform with greater computational efficiency, such as by reducing their unnecessary utilization and directing their operation to aspects of the computer resource that the user is interested in navigating.

In any combination of the above embodiments of the method, the computer resource comprises a webpage, and wherein the assistance UI panel is presented as a sidebar or a popup application window of a web browser computer application that is also presenting the computer resource.

In any combination of the above embodiments of the method, the category of the computer resource is programmatically determined using a classification model, wherein at least one feature of the first set of features of the computer resource comprises a URL, a domain name, a text, or an image, wherein the category comprises banking, education, shopping product listing, shopping product description, shopping payment, government services, utility or services payment, social media, news, entertainment, or travel planning, and wherein the assistance UI panel is generated according to a UI template that is determined based on at least the category of the computer resource.

In any combination of the above embodiments of the method, each UI control in the set of UI controls is configured to perform, upon actuation, an operation associated with its corresponding feature of the second set of features. In any combination of the above embodiments of the method, the operation comprises one of: setting a focus on the corresponding feature; navigating to another computer resource based on a location specified by the corresponding feature; actuating a control element at the corresponding feature; or issuing an API call that includes a parameter indicating the location of the corresponding feature in the computer resource.

In any combination of the above embodiments of the method, the method further comprises determining the second set of features by programmatically detecting the second set of features in the computer resource based on the category of the computer resource and by utilizing at least one entity extraction model, extracting the second set of features into a hierarchical data structure, and utilizing the data structure to determine the set of UI controls for the assistance UI panel.

In any combination of the above embodiments of the method, aspects of the computer resource are represented by an Extensible Markup Language (XML) document, and the method further comprises determining a location in the XML document for each feature of the second set of features, thereby generating a feature location index from the XML document, and utilizing the feature location index to determine the set of UI controls for the assistance UI panel.

In some embodiments, one or more computer storage media having computer-executable instructions embodied thereon that, when executed by at least one computer processor, cause computing operations to be performed. The operations comprise receiving at least a portion of a first computer resource having a plurality of features, and based on at least one feature of the first computer resource, programmatically classifying the first computer resource according to a category. The operations further comprise, based on the classification category, determining a set of features to detect in the first computer resource. The operations further comprise, programmatically determining that the first computer resource includes at least a subset of the features, and based on at least the subset of features, generating a supplemental user interface (UI) comprising at least a first control, the first control configured to correspond to a first feature of the subset of features and further configured to cause to be performed, upon actuation of the first control, an operation associated with the first feature of the subset of features. The operations further comprise, causing the UI to be presented on a first computing device such that the UI does not conceal access to the first computer resource.

Advantageously, these and other embodiments, as described herein improve existing computing technologies by providing new or improved functionality in computing applications including computer-user interface technology to facilitate access to a computer resource. In particular, these and other embodiments described herein improve computing applications for viewing or accessing a computer resource by providing new functionality, technologically enable computer users, who may have accessibility needs, to access or navigate a computer resource, and provide an improve user computing experience. Computer technology is also improved by providing new functionality that enables a computer to perform operations, which may be at the request of a user, that otherwise are inaccessible or inoperable while using conventional assistive technologies on the computer. For example, the functionality provided by these embodiments can provide improved access to a computer resource such as a website, such as providing an alternative means of accessing content on the computer resource using an assistance UI.

Further, these embodiments improve computing technology by providing a new control mechanism of the computer system that enables a user to access aspects of a computer resource that are inaccessible by conventional assistive technologies. In this way, these embodiments improve the utilization of computing resources by enabling more efficient control of computing operations by a user. Further still, these embodiments improve computing technology by providing a new, supplemental computer-user interface for accessing a computer resource, such as a website, that does not conceal or override content of computer resource. In this way, these embodiments enable an improved user experience across a number of computer devices, applications, and platforms. Moreover, particular embodiments of the assistance UI do not hide, override, or otherwise limit access to content of an existing computer resource, such as a website, but instead provide a supplemental control and consistent structure of the site content, thereby improving access and control to users with accessibility needs, as well as improving the performance of other assistive technology.

Further still, these embodiments improve computing technology by providing a computer-user interface for facilitating accessing a computer resource that is not dependent on the design or language(s) used to author the computer resource. In this way, some of these embodiments of the assistance UI provided herein for accessing a computer resource that is a website are website agnostic, with regards to the language(s) used to author a website, and do not require a website to be designed for accessibility. Nor do these embodiments require the website author to modify the website to be compatible with the assistance UI.

Further still, some of these embodiments improve computing technology by modifying the operation of other assistive technologies to improve their operation, and in so doing, also conserve utilization of resources such as bandwidth and power consumption. For example, these resources are conserved by causing the assistive technologies to perform with greater computational efficiency, such as by reducing their unnecessary utilization and directing their operation to aspects of the computer resource that the user is interested in navigating.

In any combination of the above embodiments, the operations further comprise detecting that the first control of the UI is actuated, and responsive to the detection, causing the operation associated with the first feature to be performed. In any combination of the above embodiments the operation associated with the first feature comprises one of: setting a focus on the first feature, navigating to a second computer resource based on a location specified by the first feature, actuating a control element at the first feature, and issuing an API call that includes an parameter indicating the location of the first feature in the first computer resource. In any combination of the above embodiments, the first feature includes a control element comprising one of a hyperlink, button, slider, text field, or search query input field, and the control element can be actuated by a user interacting directly with the control element via the computer resource or by the user actuating the first control of the UI.

In any combination of the above embodiments, the first computer resource comprises a webpage, and causing the UI to be presented such that the UI does not conceal access to the first computer resource comprises presenting the UI as a sidebar or a popup application window of a web browser computer application that is also presenting at least the portion of the first computer resource, the web browser computer application operating on the first computing device. In any combination of the above embodiments the operations further comprise causing the UI to be presented on the first computing device that is different than a second computing device on which the at least the portion of the first computer resource is presented.

Example Computing Environments

Figure 8:
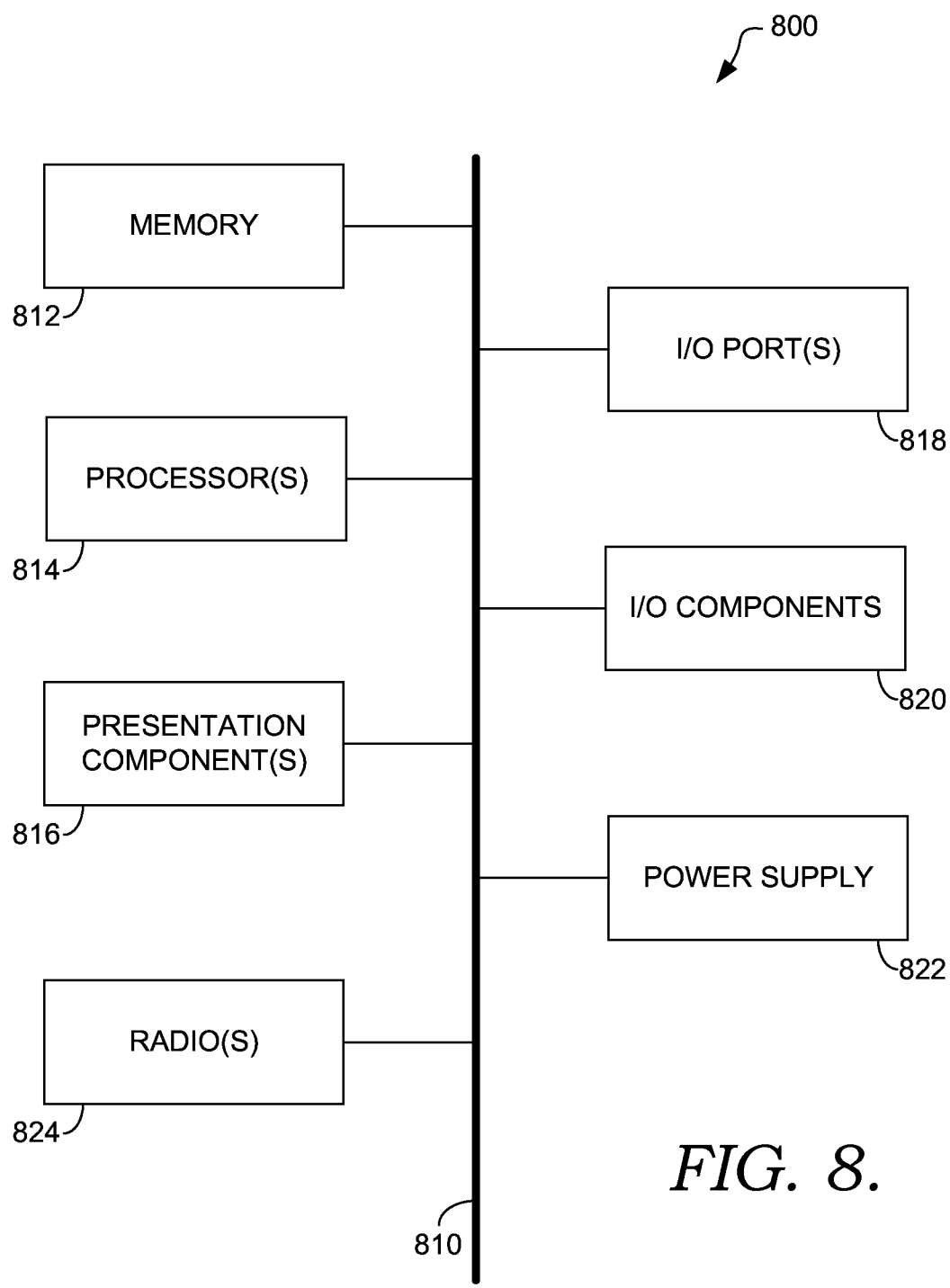
FIG. 8 is a block diagram of an example computing environment suitable for use in implementing an embodiment of the present disclosure.
Figure 9:
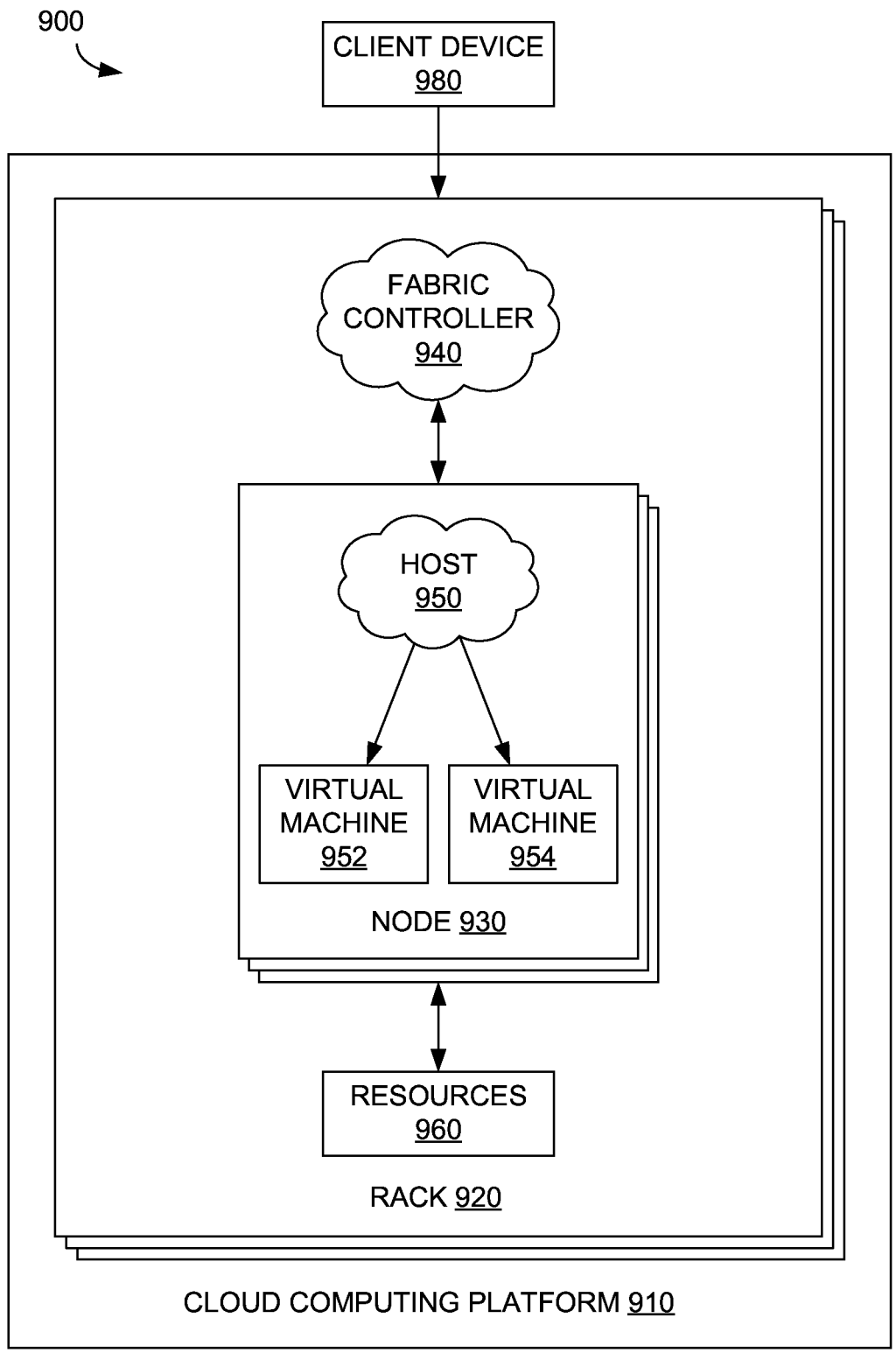
FIG. 9 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 8 and 9, respectively. With reference to FIG. 8, an exemplary computing device is provided and referred to generally as computing device 800. The computing device 800 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions may include any software, including low level software written in machine code, higher level software, such as application software, and any combination thereof. In this regard, the system components can manage resources and provide services for system functionality. Any other variations and combinations thereof are contemplated with embodiments of the present disclosure.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more buses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," or "handheld device," as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other hardware medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include, for example, solid-state memory, hard drives, and optical-disc drives. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a keyboard, touch screen or touch-sensitive surface, microphone, camera, mouse, joystick, game pad, satellite dish, scanner, printer, or a wireless peripheral device. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 824 (or similar wireless communication components). The radio transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, FDMA, and 802.16 protocols, or other long-range communication protocols used by mobile devices.

Referring now to FIG. 9, an example distributed computing environment 900 is illustratively provided, in which implementations of the present disclosure may be employed. In particular, FIG. 9 shows a high level architecture of an example cloud computing platform 910 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support a distributed computing environment 900 that includes cloud computing platform 910, rack 920, and node 930 (e.g., computing devices, processing units, or blades) in rack 920. The technical solution environment can be implemented with cloud computing platform 910, which runs cloud services across different data centers and geographic regions. Cloud computing platform 910 can implement fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. Cloud computing platform 910 may be a public cloud, a private cloud, or a dedicated cloud.

Node 930 can be provisioned with host 950 (e.g., operating system or runtime environment) running a defined software stack on node 930. Node 930 can also be configured to perform specialized functionality (e.g., compute nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a multi-tenant infrastructure or tenancy. The terms "service application," "application," or "service" are used interchangeably with regards to FIG. 9, and broadly refer to any software, or portions of software, that run on top of, or access storage and computing device locations within, a datacenter.

When more than one separate service application is being supported by nodes 930, nodes 930 may be partitioned into virtual machines (e.g., virtual machine 952 and virtual machine 954). Physical machines can also concurrently run separate service applications. The virtual machines or physical machines can be configured as individualized computing environments that are supported by resources 960 (e.g., hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In particular, the servers may perform data operations independently but exposed as a single device, referred to as a cluster. Each server in the cluster can be implemented as a node.

Client device 980 may be linked to a service application in cloud computing platform 910. Client device 980 may be any type of computing device, such as user device 102n described with reference to FIG. 1, and the client device 980 can be configured to issue commands to cloud computing platform 910. In embodiments, client device 980 may communicate with service applications through a virtual Internet Protocol (IP) and load balancer or other means that direct communication requests to designated endpoints in cloud computing platform 910. The components of cloud computing platform 910 may communicate with each other over a network (not shown), which may include, without limitation, one or more local area networks (LANs) and/or wide area networks (WANs).

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a computing device or a distributed computing environment; however the computing device and distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computerized system to provide an assistance user interface (UI) to facilitate access to a computer resource, the system comprising:
  at least one processor; and
  computer memory having computer-readable instructions embodied thereon, that, when executed by the at least one processor, perform operations comprising:
    receive at least a portion of a first computer resource;
    extracting a set of features from the portion of the first computer resource;
    based on the set of features, cause a model to determine a category associated with the set of features;
    based on the category, cause the model to determine a subset of features of the set of features associated with a sub-category associated with the category;
    determine that the first computer resource includes at least the subset of features of the set of features;
    based on the subset of features, generate a supplemental user interface (UI) where a portion of the supplemental UI is associated with the sub-category comprising at least a first control, the first control configured to correspond to a first feature of the subset of features and further configured to cause to be performed, upon actuation of the first control, an operation associated with the first feature of the subset of features; and cause the UI to be presented on a first computing device such that the UI does not conceal access to the first computer resource.

2. The system of claim 1, wherein the operations further comprise:

detecting that the first control is actuated;

in response to detecting that the first control is actuated, causing the operation associated with the first feature to be performed; and wherein the operation associated with the first feature comprises one of: setting a focus on the first feature, navigating to a second computer resource based on a location specified by the first feature, actuating a control element at the first feature, and issuing an API call that includes an parameter indicating the location of the first feature in the first computer resource.

3. The system of claim 1, wherein the first computer resource comprises a webpage, and wherein causing the UI to be presented comprises presenting the UI as a sidebar or a popup application window of a web browser computer application that is also presenting at least the portion of the first computer resource, the web browser computer application operating on the first computing device.

4. The system of claim 1, wherein the first feature includes a control element comprising one of a hyperlink, button, slider, text field, or search query input field; and wherein the control element can be actuated by a user interacting directly with the control element via the computer resource or by the user actuating the first control of the UI.

5. The system of claim 1, wherein the first control comprises a first control name that is determined based on a feature type of the first feature.

6. The system of claim 1, wherein the UI is generated according to a UI template that is determined based on at least the category of the first computer resource.

7. The system of claim 1, wherein the at least one feature comprises a URL, a domain name, a text, or an image; and wherein programmatically determining that the first computer resource includes at least the subset of features comprises utilizing an entity extraction model that is determined from training an entity recognition model to detect the at least one feature of the subset of features.

8. The system of claim 1, wherein aspects of the first computer resource are represented by an Extensible Markup Language (XML) document, and further comprising:

determining a location in the XML document for each feature of the subset of features, thereby generating a feature location index from the XML document; and utilizing the feature location index to generate the UI comprising at least the first control.

9. The system of claim 1, wherein aspects of the first computer resource are represented by a Document Object Model (DOM), and further comprising:

generating or modifying the DOM to include an indication of each feature of the subset of features at a location in the DOM corresponding to the location of that feature in the computer resource; and utilizing the generated or modified DOM to generate the UI comprising at least the first control.

10. The system of claim 1, wherein causing the UI to be presented such that the UI does not conceal access to the first computer resource comprises at least one of:

causing the UI to be presented proximate to a presentation of the at least the portion of the first computer resource; and causing the UI to be presented on the first computing device that is different than a second computing device on which the at least the portion of the first computer resource is presented.

11. The system of claim 1, wherein the first computer resource comprises a webpage; and wherein the category comprises one of: banking, education, shopping product listing, shopping product description, shopping payment, government services, utility payment, consumer services payment, social media, news, entertainment, or travel planning.

12. A computer-implemented method to provide an assistance user interface (UI) to facilitate access to a computer resource, the method comprising:

receiving the computer resource that comprises webpage;

extracting a set of features from the computer resource;

causing a classification model to determine a category of the computer resource based on a first subset of features of the set of features;

determining, using an entity extraction model, a second subset of features of the set of features based on the category, wherein the second subset of features corresponds a set of UI controls for an assistance UI panel, each UI control in the set of UI controls corresponding to a feature in the second subset of features;

generating the assistance UI panel that includes the set of UI controls, where a portion of the assistance UI panel is associated with the category; and presenting the assistance UI panel with a presentation of the computer resource without altering the presentation of the computer resource.

13. The computer-implemented method of claim 12, wherein the assistance UI panel is presented as a sidebar or a popup application window of a web browser computer application that is also presenting the computer resource.

14. The computer-implemented method of claim 12:

wherein at least one feature of the first subset of features comprises a URL, a domain name, a text, or an image;

wherein the category comprises banking, education, shopping product listing, shopping product description, shopping payment, government services, utility or services payment, social media, news, entertainment, or travel planning; and wherein the assistance UI panel is generated according to a UI template that is determined based on at least the category.

15. The computer-implemented method of claim 12:

wherein each UI control in the set of UI controls is configured to perform, upon actuation, an operation associated with its corresponding feature of the second subset of features; and wherein the operation comprises one of: setting a focus on the corresponding feature; navigating to another computer resource based on a location specified by the corresponding feature; actuating a control element at the corresponding feature; or issuing an API call that includes a parameter indicating the location of the corresponding feature in the computer resource.

16. The computer-implemented method of claim 12, further comprising:

determining the second subset of features is further based on the category of the computer resource;

extracting the second subset of features into a hierarchical data structure; and utilizing the hierarchical data structure to determine the set of UI controls for the assistance UI panel.

17. The computer-implemented method of claim 12, wherein aspects of the computer resource are represented by an Extensible Markup Language (XML) document, and further comprising:
 determining a location in the XML document for each feature of the second subset of features, thereby generating a feature location index from the XML document; and
 utilizing the feature location index to determine the set of UI controls for the assistance UI panel.

18. Computer storage media having computer-executable instructions embodied thereon, that, when executed by at least one computer processor, cause computing operations to be performed, the operations comprising:
 receiving at least a portion of a first computer resource;
 determining a first set of features based on the portion of the first computer resource;
 based on at least one feature of the first set of features, cause a classification model to determine a category associated with the first computer resource;
 based on the category, determining, using an inference model to, a second set of features in the first computer resource;
 programmatically determining that the first computer resource includes at least a subset of features of the second set of features;
 based on at least the subset of features of the second set of features, generating a supplemental user interface (UI) associated with the category comprising at least a first control, the first control configured to correspond to a first feature of the subset of features of the second set of features and further configured to cause to be performed, upon actuation of the first control, an operation associated with the first feature of the subset of features of the second set of features; and
 causing the UI to be presented on a first computing device such that the UI does not conceal access to the first computer resource.

19. The computer storage media of claim 18, wherein the operations further comprise:
 detecting that the first control of the UI is actuated; and
 in response to detecting that the first control of the UI is actuated, causing the operation associated with the first feature to be performed;
 wherein the operation associated with the first feature comprises one of: setting a focus on the first feature, navigating to a second computer resource based on a location specified by the first feature, actuating a control element at the first feature, and issuing an API call that includes an parameter indicating the location of the first feature in the first computer resource;
 wherein the first feature includes the control element comprising one of a hyperlink, button, slider, text field, or search query input field; and
 wherein the control element can be actuated by a user interacting directly with the control element via the first computer resource or by the user actuating the first control of the UI.

20. The computer storage media of claim 18
 wherein the first computer resource comprises a webpage; and
 wherein causing the UI to be presented such that the UI does not conceal access to the first computer resource comprises at least one of:
  presenting the UI as a sidebar or a popup application window of a web browser computer application that is also presenting at least the portion of the first computer resource, the web browser computer application operating on the first computing device; and
  causing the UI to be presented on the first computing device that is different than a second computing device on which the at least the portion of the first computer resource is presented.

\* \* \* \* \*